US007185756B2

(12) United States Patent
Matsumoto et al.

(10) Patent No.: US 7,185,756 B2
(45) Date of Patent: Mar. 6, 2007

(54) DISCHARGE DEVICE FOR WORKED MATERIAL

(75) Inventors: Masatsuki Matsumoto, Buzen (JP); Shinsuke Matsumoto, Nakatsu (JP)

(73) Assignee: Matsumoto Industry Co., Ltd., Kitakyushu (JP)

( * ) Notice: Subject to any disclaimer, the term of this patent is extended or adjusted under 35 U.S.C. 154(b) by 148 days.

(21) Appl. No.: 10/534,872

(22) PCT Filed: Oct. 24, 2003

(86) PCT No.: PCT/JP03/13686

§ 371 (c)(1),
(2), (4) Date: May 12, 2005

(87) PCT Pub. No.: WO2004/045788

PCT Pub. Date: Jun. 3, 2004

(65) Prior Publication Data

US 2006/0060453 A1 Mar. 23, 2006

(30) Foreign Application Priority Data

Nov. 15, 2002 (JP) ............................ 2002-332579

(51) Int. Cl.
*B65G 27/32* (2006.01)
*B21D 45/00* (2006.01)

(52) U.S. Cl. ...................... 198/753; 198/759; 198/761; 198/763

(58) Field of Classification Search ............... 198/753, 198/759, 761, 763; 74/53, 54
See application file for complete search history.

(56) References Cited

U.S. PATENT DOCUMENTS 2,991,872 A * 7/1961 Keegan ...................... 198/766
3,707,246 A * 12/1972 Ewell ......................... 222/134

(Continued)

FOREIGN PATENT DOCUMENTS

JP 58-9244 U 1/1983

(Continued)

*Primary Examiner*—Douglas Hess
(74) *Attorney, Agent, or Firm*—Kubovcik & Kubovcik

(57) ABSTRACT

A discharge device for worked material is provided. The worked material produced by the press working is received on a chute arranged just below a lower die. The chute is driven to make a reciprocating motion within a substantially horizontal plane in response to a die stroke. At a moment of stopping of the forward movement of the chute, an inertia force acting on the worked material from the chute is greater than a static frictional force. Or otherwise, a force taking effect upon starting of a backward movement of the chute is greater than the static frictional force. Consequently, the worked material is due to be discharged from the chute.

20 Claims, 21 Drawing Sheets

U.S. PATENT DOCUMENTS 4,062,202 A * 12/1977 Cloudy ........................ 62/380
4,226,326 A * 10/1980 Watkins ...................... 198/758
4,373,370 A * 2/1983 Allen et al. ................... 72/349
4,502,615 A * 3/1985 Stangl ........................ 222/199
4,658,626 A * 4/1987 Yamada et al. ............ 72/405.1
4,724,949 A 2/1988 Misina ....................... 198/750
4,993,937 A * 2/1991 Ginnasi ...................... 425/444
5,054,606 A * 10/1991 Musschoot .................. 198/751
5,341,307 A * 8/1994 Myhre et al. ............... 700/240
5,372,237 A * 12/1994 Yagi .......................... 198/444
5,526,917 A * 6/1996 Homma ...................... 198/444
5,680,787 A * 10/1997 Fisch ...................... 72/405.16
5,904,254 A * 5/1999 Tinsley et al. .............. 209/314
6,250,471 B1 * 6/2001 Ruthven et al. ........... 209/12.1
6,402,004 B1 * 6/2002 Yoshikuni et al. ............. 225/2
6,854,585 B2 * 2/2005 Brooks et al. .............. 198/394

FOREIGN PATENT DOCUMENTS

JP 4-105730 A 4/1992
JP 5-237 U 1/1993
JP 8-243664 A 9/1996
JP 9-308864 A 12/1997

* cited by examiner

DISCHARGE DEVICE FOR WORKED MATERIAL

This application is a 371 of international application PCT/JP2003/013686, which claims priority based on Japanese patent application No. 2002-332579 filed Nov. 15, 2002, which is incorporated herein by reference.

FIELD OF THE INVENTION

The present invention relates to a discharge device for worked material and more particularly to a discharge device for worked material, which is operable for discharging worked material (e.g., a product and/or a scrap) that has been produced from press working.

DESCRIPTION OF THE PRIOR ART

Referring to FIG. 27, there is shown a perspective view of a discharge device for worked material according to a prior art. The discharge device is disposed just below a press machine. The press machine comprises an upper die 1 arranged to be movable in a vertical direction and a lower die 2 disposed below the upper die 1. The lower die 2 is securely fixed to a support table 9 and the upper die 2 is provided with a drive means, though not shown.

In the press machine, raw material (e.g., sheet material) is loaded on a top surface of the lower die 2, and then the upper die 1 is driven by the drive means to make a vertical reciprocating motion relative to the lower die 2 so that a press working is applied to the material to form it into a work 3*a* and a scrap 3*b* which is to be discharged simultaneously.

The press machine is typically provided with a chute (a discharge device) 30 arranged just below the lower die 2 in order to discharge the scrap 3*b*, comprising a receiving plate inclining downward so as to define a moderate slope along a discharging direction. The pieces of scrap 3*b* drop on the chute 30, particularly onto a receiving surface (a top surface) of the receiving plate, and then slide down along the slope of the receiving surface to be discharged to the outside.

A larger slope angle of the chute 30 would facilitate the sliding and thus the discharging of the scrap 3*b* to the outside. However, such a configuration requires an increased height of a space for accommodating the chute 30 secured below the supporting table 9. This, for example, in case of no sufficient space available below the press machine, could lead to another problem of inverse affection to a stroke of the upper die 1.

In contrast, a smaller slope angle of the chute 30 could make it difficult to discharge the scrap 3*b* from the chute 30 to the outside. Especially, a certain type of scrap 3*b* having a small mass or a higher friction coefficient is more likely to end up in a stagnation of the scrap 3*b* over the slope surface of the chute 30. If the smooth discharging of the scrap 3*b* is inhibited, the scrap 3*b* in accumulation could deposit on the lower die and cause a break in the upper and/or the lower dies or a damage in the work 3*a*. In this circumstance, to avoid the above problem, it has been required to stop the press machine frequently and to remove the accumulation of the scrap 3*b* from the chute 30.

One known method for addressing the problem of the stagnation of the scrap 3*b* in another prior art includes an air blowing method in which a compressed air is blown over the receiving surface of the chute 30 from the above so as to blow off the scrap 3*b* from the chute 30.

In the air blowing method, however, it has been required to employ an air gun, an air compressor and a power supply as components of the blowing unit, resulting in further increase in equipment cost or running cost. There has been another problem associated with the above method that the blowing of the air generates powder dust of scrap 3*b* in particulate scattered in all directions and leading to pollution in plant environment. More disadvantageously, there has been a fear in conjunction with the case of deposition of the blown dust of scrap 3*b* in any peripheral sites, particularly the deposition over the die, that the damage of the work 3*a* or the break of the die could be developed as discussed above.

In the light of the above-pointed problems, an object of the present invention is to provide a discharge device for worked material, which allows the worked material to be discharged with simple equipment that has successfully eliminated the need for a supply source of the air and a space restriction in a press machine and that can prevent the scattering of the scrap.

Another object of the present invention is to provide a discharge device for worked material, which is operable to discharge/recover a work and a scrap in a separated condition from each other.

Another object of the present invention is to provide a discharge device for worked material, which allows for the worked material to be discharged reliably and smoothly in one direction from the top of a chute after the chute having been stopped.

Another object of the present invention is to provide a discharge device for worked material, in which a chute can be configured in a reduced thickness so as to realize a reduced profile of the discharge device and thus to save a space therefor.

Another object of the present invention is to provide a discharge device for worked material, in which the worked materials may be selectively separated into an upper group and a lower group and further each of thus separated group may be discharged in any desired directions.

Another object of the present invention is to provide a discharge device for worked material, in which a connection between an actuator member and a chute is hardly breakable even after a long operating period of a chute in reciprocating motion.

Another object of the present invention is to provide a discharge device for worked material, in which a connection between an actuator member and a chute has been reinforced.

Another object of the present invention is to provide a discharge device for worked material, which can provide a smooth input operation from a cam body to an actuator member.

The present invention allows for the worked material to be discharged from a chute to the outside of a pressing unit in a stable manner.

SUMMERY OF THE INVENTION

A first invention provides a discharge device for worked material, which is disposed in a press working apparatus for applying a press working to a material through a vertical reciprocating motion of an upper die relative to a lower die and which is operable to discharge a worked material produced resultantly from the press working, said device comprising: a chute adapted to receive the worked material produced resultantly from the press working and to discharge the worked material to the outside of the press working apparatus by making a reciprocating motion within a substantially horizontal plane; and a drive means for driving the chute in response to the vertical reciprocating motion of the upper die, wherein said drive means is adapted to drive the chute such that at a moment of stopping of the chute, a force exerted on the worked material in association with the movement of the chute in the direction of the chute movement is greater than a force exerted on the worked material based on a frictional force between the worked material and the chute in the direction opposite to that of the chute movement.

According to the first invention, the press working is applied to the raw material between the upper and the lower dies through the vertical reciprocating motion of the upper die to produce a worked material (a stamping product and/or a scrap).

When the upper die has been lowered to the predetermined position, the drive means drives the chute to make a reciprocating motion within the substantially horizontal plane. Specifically, the chute is moved forth in one direction at a predetermined speed, stopped once, and then moved back in the opposite direction. At a moment of stopping of the chute, the force of predetermined magnitude is exerted on the worked material from the movement of the chute. This force is greater than the other force acting on the worked material from the friction between the worked material and the chute in the direction opposite to that of the previous force. As a result, the worked material is discharged from the chute to the outside of the press working apparatus.

The first invention has employed the chute which is arranged below the lower die and is driven by the drive means so as to make the reciprocating motion within the substantially horizontal plane in response to the vertical reciprocating motion of the upper die. In addition, the force exerted on the worked material in association with the driving (motion) of the chute in the direction thereof is controlled to be greater than the force acting on the worked material based on the friction effective between the worked material and the chute at the moment of subsequent stopping of the chute in the direction opposite to the previous force. This allows for the worked material to be discharged with a simplified equipment without the need for the supply source of the air and thus without restricting the space therefor within the press machine while effectively preventing the scrap from being scattered therearound.

The type of the material is not limited. For example, many different types of metal or synthetic resin plate may be employed.

The worked material herein includes the scrap generated as a by-product during the press working in addition to the products obtained from the press working (e.g., apiece of plate formed in a certain geometry, which has been punched out of the raw material).

Each of the lower and the upper dies may be such a die of heating type with a heater incorporated therein. Further, each of them may be a die having no heater.

The material, shape and size used for the chute is not limited. For example, a chute may have a receiving plate having a rectangular shape in plan view.

The structure of the drive means is not limited. For example, the drive means may employ such a structure in which the chute is driven by a spring force. Alternatively, a drive means may be equipped with a pneumatic pressure source, a water pressure source or a hydraulic pressure source.

The description of "said drive means is adapted to drive the chute such that at a moment of stopping of the chute, a force exerted on the worked material . . . is greater than a force exerted on the worked material based on a frictional force between the worked material and the chute", means that the drive means drives the chute in such a manner that an inertia force acting on the worked material at the time of stopping of the movement of the chute in one direction at the predetermined speed can be greater as compared to the another force acting on the worked material generated from the friction between the worked material and the chute at that time in the other direction opposite to said one direction. Accordingly, when the chute has stopped, the worked material on the chute is to move in the driving direction of the chute (the discharging direction of the worked material).

A second invention provides a discharge device for worked material, which is disposed in a press working apparatus for applying a press working to a material through a vertical reciprocating motion of an upper die relative to a lower die and which is operable to discharge a worked material produced resultantly from the press working, said device comprising: a chute adapted to receive the worked material produced resultantly from the press working and to discharge the worked material to the outside of the press working apparatus by making a reciprocating motion within a substantially horizontal plane; and a drive means for driving the chute in response to the vertical reciprocating motion of the upper die, wherein the drive means is adapted to drive the chute such that at a moment of starting of its driving operation, a force exerted on the worked material in association with the movement of the chute in the direction of the chute movement is greater than a force exerted on the worked material based on a frictional force between the worked material and the chute in the direction opposite to that of the chute movement.

According to the second invention, the drive means drives the chute such that at the moment of starting of the driving of the chute in response to the vertical movement of the upper die, the force exerted on the worked material in association with the movement of the chute within the horizontal plane in the direction of the chute movement is greater than the horizontal force exerted on the worked material based on the friction between the worked material and the chute in the direction opposite to that of the chute movement. As a result, the worked material is to be left in its current position in contrast to the chute being moved within the horizontal plane. The result is that the worked material should have been moved relative to the chute (in the chute) by a certain distance in said opposite direction within the same horizontal plane.

A third invention provides a discharge device for worked material as defined by the first or the second invention, in which said drive means comprises: a cam member and a follower member which are arranged in contact with each other and are operable to convert the downward movement of the upper die to a forward movement of the chute in one direction within a substantially horizontal plane; and a resilient member which is operable to bias the chute to make a backward movement in other direction opposite to said one direction of said forward movement when the cam member is disengaged from the contact with the follower member.

According to the third invention, when the upper die has lowered to a predetermined position, the cam member is brought into contact with the follower member. As a result of the contact engagement between the cam member and the follower member, the follower member actuates the chute to make the forward movement in the one direction at the predetermined speed against the resilient force from the resilient member. When the cam member has been disengaged from the contact with the follower member, the chute is forced back in the opposite direction by the resilient force from the resilient member and stopped therein. Consequently, at a moment of stopping of the chute, the worked material on the chute is due to be discharged to the outside of the press working apparatus with the aid of the inertia force from the movement in itself.

Besides, at the moment of starting of the forward (backward) movement of the chute, only the chute is moving but the worked material remains stopped. Owing to the movement of the chute, the worked material is to be discharged to the outside.

As just described, since a cam mechanism with the resilient member is employed as the drive means, the chute can be driven with a simple structure but in an accurate manner.

The type of the cam member and the follower member is not limited. A pair of cam member and follower member from many different types of two-dimensional cam mechanism and a pair of cam member and follower member from many different types of three-dimensional cam mechanism may be employed. The cam member may be connected directly to the upper die, or alternatively the cam member may be attached directly to a slide carrying the upper die. The follower member may also be attached to the lower die or a bolster (a lower die support member) in correspondence to the mounting member for the cam member.

The material and type used for the resilient member is not limited. For example, various types of metal spring and various types of resin spring may be employed. Additionally, a resilient member made of rubber, a sponge made of expanded synthetic resin and the like may be employed.

A fourth invention provides a discharge device for worked material as defined by the third invention, in which said chute comprises a receiving plate, said receiving plate having a receiving surface for receiving the worked material that has dropped thereon and a hit wall upon which the worked material hits during the forward and backward movement of the chute, wherein a plurality of pairs of the receiving surface and the hit wall are arranged in series to define a step-like configuration of the receiving surfaces of the receiving plate.

According to the fourth invention, the worked material that has dropped from the lower die is received on the receiving surface of the receiving plate. Then, during the chute moving forward and backward, the worked material hits on the hit wall of the receiving plate. The worked material having hit on the hit wall is prohibited its further movement toward the hit surface side. As a result, upon stopping of the chute, the worked material is due to be discharged from the chute to the outside of the press working apparatus.

Or otherwise, at a moment of starting of the forward or the backward movement of the chute, the worked material hits on the hit wall and thus has its further movement prohibited but controlled to move relative to the chute and finally to be discharged to the outside thereof.

The number of the paired receiving surface and hit wall used in the receiving plate is not limited but one or more pairs thereof may be used.

A fifth invention provides a discharge device for worked material as defined by the fourth invention, in which said receiving surface is inclined upward by a predetermined angle relative to a substantially horizontal plane.

The description of " . . . is inclined upward . . . " also implies that the height of the receiving surface measured from the horizontal plane increases toward the discharging direction.

According to the fifth invention, during a few cycles of reciprocating forward and backward motion of said chute, the worked material will be advanced on each of the receiving surfaces toward the discharging direction. Although the receiving surface is inclined upward, the worked material can be reliably discharged with the aid of the movement of the chute.

In this regard, the height of the hit walls may be differentiated, and in that case, a large-sized piece of worked material (e.g., work) may mainly hit on a taller hit wall where it is directed to advances toward the discharging direction. On the other hand, a small-sized piece of worked material (e.g., scrap) may mainly hit on a shorter hit wall where it is directed to advance toward the discharging direction. Ultimately, the worked material is discharged out of the chute.

Two or more types of the hit wall defined by the different heights may be used. For example, taking the shortest hit wall as a reference, three different types of hit wall may be employed, including the one defining the reference height, the one defining a double height of the reference height and the one defining a triple height of the reference height.

The sequence in placement of the hit walls having different height is not limited.

Further, the length of the receiving surface along the discharging direction may be differentiated, and in that case, as the worked material is advanced on each receiving surface toward the discharging direction, a large-sized piece of worked material may be received on a longer receiving surface (defined by a longer distance between the hit walls). On the other hand, a small-sized piece of worked material may be received on a shorter receiving surface. The worked material is ultimately discharged out of the chute.

Two or more types of the receiving surface defined by the different length along the longitudinal direction of the chute may be used. For example, taking the chute of the shortest length along the longitudinal direction as a reference, three different types of receiving surface may be employed, including the one defining the reference length, the one defining a double length of the reference length and the one defining a triple length of the reference length. The sequence in placement of the receiving surfaces having different length is not limited.

The discharge device includes a plurality of pairs of said receiving surface and said hit wall arranged in series. Owing to this arrangement, in a few cycles of the reciprocating forward and backward motion of the chute, each worked material is advanced on each receiving surface toward the discharging direction and ultimately discharged out of the chute. Further, each receiving surface is inclined upward by a predetermined angle relative to the plane defined by the reciprocating motion of the chute. Owing to this configuration, the thickness (height) of the receiving plate of the chute having the step-like profile can be reduced.

The angle of inclination of the receiving plate is not limited.

A sixth invention provides a discharge device for worked material as defined by the fourth or the fifth invention, in which said receiving surface includes a through-hole or a mesh formed therethrough.

According to the sixth invention, the through-hole or the mesh has been formed in the receiving surface of the chute. In this configuration, a smaller-sized piece of worked material relative to the size of the through-hole or the mesh opening drops down through the through-hole or the mesh opening of the chute in association with the reciprocating motion of the chute. This allows a large-sized piece of worked material relative to the size of the through-hole or the mesh opening to remain moving on the receiving surface of the chute to be discharged out of the chute.

Either of the through-hole or the mesh may be formed in the receiving surface of the receiving plate.

The size, the number and the range of formation of the through-holes or the meshes in the receiving surface area are not limited.

A seventh invention provides a discharge device for worked material as defined by the sixth invention, said device further comprising a lower chute located below the chute and including a receiving plate for receiving the worked material that has been discharged through the through-hole or the mesh, and a lower drive means for driving said lower chute to move forward and backward within a substantially horizontal plane in response to the vertical reciprocating motion of the upper die, said receiving plate of the lower chute comprising a receiving surface and a hit wall on which the worked material hits during the forward and backward movement of the lower chute.

According to the seventh invention, the lower chute is additionally disposed below the chute, which is adapted to make a reciprocating forward and backward motion within the substantially horizontal plane. In this configuration, a relatively small-sized piece of worked material as compares to the size of the through-hole or the mesh of the upper chute drops through the through-hole or the mesh opening down onto the receiving surface of the lower chute. Then, the worked material that has dropped down on the lower chute is discharged out of the press working apparatus with the aid of the horizontal reciprocating motion of the lower chute.

On the other hand, a larger-sized piece of worked material as compared to the size of the through-hole or the mesh is received on the upper chute and discharged out of the press working apparatus. The smaller-sized worked material as compared to those described above is received on the lower chute and discharged out of the press working apparatus.

The shape and size of the lower chute is not limited. Also, the material of the receiving plate is not limited.

The configuration of the lower drive means is not limited. For example, the lower drive means of motor-driven type or actuator-driven type may be employed.

An eighth invention provides a discharge device for worked material as defined by the forth invention, in which a connection between the follower member and the chute is in a plane substantially coplanar with the receiving surface of the receiving plate.

According to the eighth invention, the chute is driven by the drive means to make a reciprocating motion. In this concern, the connection between the follower member and the chute is substantially coplanar with the receiving surface of the receiving plate. The connection bears a tension load and a compression load. Assuming that a protrusion is formed in a part of the receiving plate and the connection is placed therein, a shear load is applied to a base of the protrusion during the reciprocating forward and backward motion of the chute. With the same magnitude of loading if applied, the loading of the tension load or the compression load results in a possibly minor damage to the connection as compared to the shear load. This configuration helps the connection between the follower member and the chute be hardly broken even after a long operating period of the chute in the reciprocating motion.

The shape and the size of the connection between the follower member and the chute are not limited. Any geometry of the connection may be employed so far as the connection is defined in substantially the same plane as the receiving surface of the receiving plate.

The connection between the follower member and the chute may be provided with a reinforcement member to reinforce the connection.

The reinforcement member serves to reinforce the connection between the follower member and chute and thus enhance the strength thereof. This may further help the connection be hardly broken.

The material, the shape and the size of the reinforcement member are not limited. What is important is that the reinforcement member can actually provide for the reinforcement of the connection.

The ninth invention provides a discharge device for worked material as defined by the third invention, in which the follower member comprises: a follower bracket to be attached to said lower die; an actuator member which is pivotally mounted on the follower bracket via a follower pivot pin so as to be rotatable in a vertical plane and includes an input protrusion protruding in one side of a pivotally supported portion thereof by the follower bracket; and a follower resilient member for biasing the actuator member to a direction, with respect to the rotational directions of the actuator member, opposite to the discharging side of the worked material, and said cam member comprises: a mounting bracket to be attached to said upper die; a cam body suspending from the mounting bracket via a cam pivot pin so as to be rotatable in a vertical plane; and a cam resilient member for biasing the cam body to a direction, with respect to the rotational directions of the cam body, opposite to the discharging side of the worked material, wherein a stopper is provided in a root portion of the cam body for prohibiting the rotation of the cam body to the direction, with respect to the rotational directions of the actuator member, toward the discharging side of the worked material, and an input pin is mounted on a front end portion of the cam body, which is to come into contact with said input protrusion of the actuator member and is placed in a point offset from a position just below said cam pivot pin to a direction, with respect to the rotational directions of the cam body, opposite to the discharging side of said worked material.

According to the ninth invention, when the upper die has been lowered to a predetermined position, the input pin of the cam body comes into contact with the input protrusion of the actuator member. Subsequently, as the upper die is further lowered, a push force of the input pin against the input protrusion increases. This causes the cam body in the suspending configuration to rotate gradually outward with respect to the upper die against the resilient force of the cam resilient member, while simultaneously causing the actuator member to rotate toward the side of discharging of the worked-material against the resilient force from the follower resilient member. As a result, the chute is moved forward in one direction.

In this arrangement, the front end of the cam body is prohibited from rotating toward the upper die by the stopper when the cam body is in the suspending configuration (normal configuration) before the input force is applied from the input pin. In the suspending configuration of the cam body, the input pin is placed in a location offset from the point just below the cam pivot pin toward an outside of the upper die. Owing to this arrangement, when the input pin comes into contact with the input protrusion, the load is applied to the cam body from the point offset from the moving direction of the cam pivot pin. Consequently, the cam body is subject to the rotational force around the cam pivot pin at any times. This facilitates the input operation from the cam body to the actuator member to be carried out smoothly. With this configuration, possible buckling of the input pin and the input protrusion can be avoided, which tends to occur due to the sticking of the rotational motion of the cam body when the input pin is disposed just below the cam pivot pin, for example.

The material, the shape and the size for the follower bracket, the mounting bracket and the actuator member are not limited, respectively. The input protrusion may be integrally formed with the actuator member or may be formed separately.

The follower resilient member and the cam resilient member may employ, for example, various types of metal spring or various types of resin spring. Further, a resilient member made of rubber and a sponge made of expanded synthetic resin may also be employed.

The stopper may be disposed on the mounting bracket. Alternatively, the stopper may be disposed in the cam body.

The minimum length as measured from the point just below the cam pivot pin to the input pin is not limited.

It is to be understood that said chute may be driven constantly at a certain speed. For example, the forward movement by the cam may be determined in dependence on the lowering speed of the upper die and the backward movement by the spring may be determined in dependence on the spring force. The backward movement may be carried out at a higher speed than that of the forward movement.

In one example, at a moment of stopping of the chute, the force greater than the force acting for immobilizing the worked material based on the friction between the worked material and the chute takes effect to the chute by the drive means. At this time, the moving speed of the chute is normally constant. Consequently, it ensures that the worked material can be discharged from the chute to the outside of the press working apparatus in a steady manner.

The driving speed of the chute is not limited. What is important is that the driving speed applied to the chute by the drive means should be sufficient to provide the inertia force to the worked material at a moment of stopping of the chute, that is greater than the static frictional force acting on the worked material.

Further, the drive means may be disposed in said chute specifically in its side of discharging the worked material. Alternatively, it may be disposed in the chute in its side opposite to that of discharging the worked material.

If the drive means is disposed in the chute in the discharging side of the worked material, the drive means may be of pull-type for pulling the chute toward the discharging side. Or otherwise, if the drive means is disposed in the chute in its side opposite to the discharging side of the worked material, the drive means may be of push-type for pushing the chute toward the discharging side.

DESCRIPTION OF THE PREFERRED EMBODIMENTS

Figure 1:
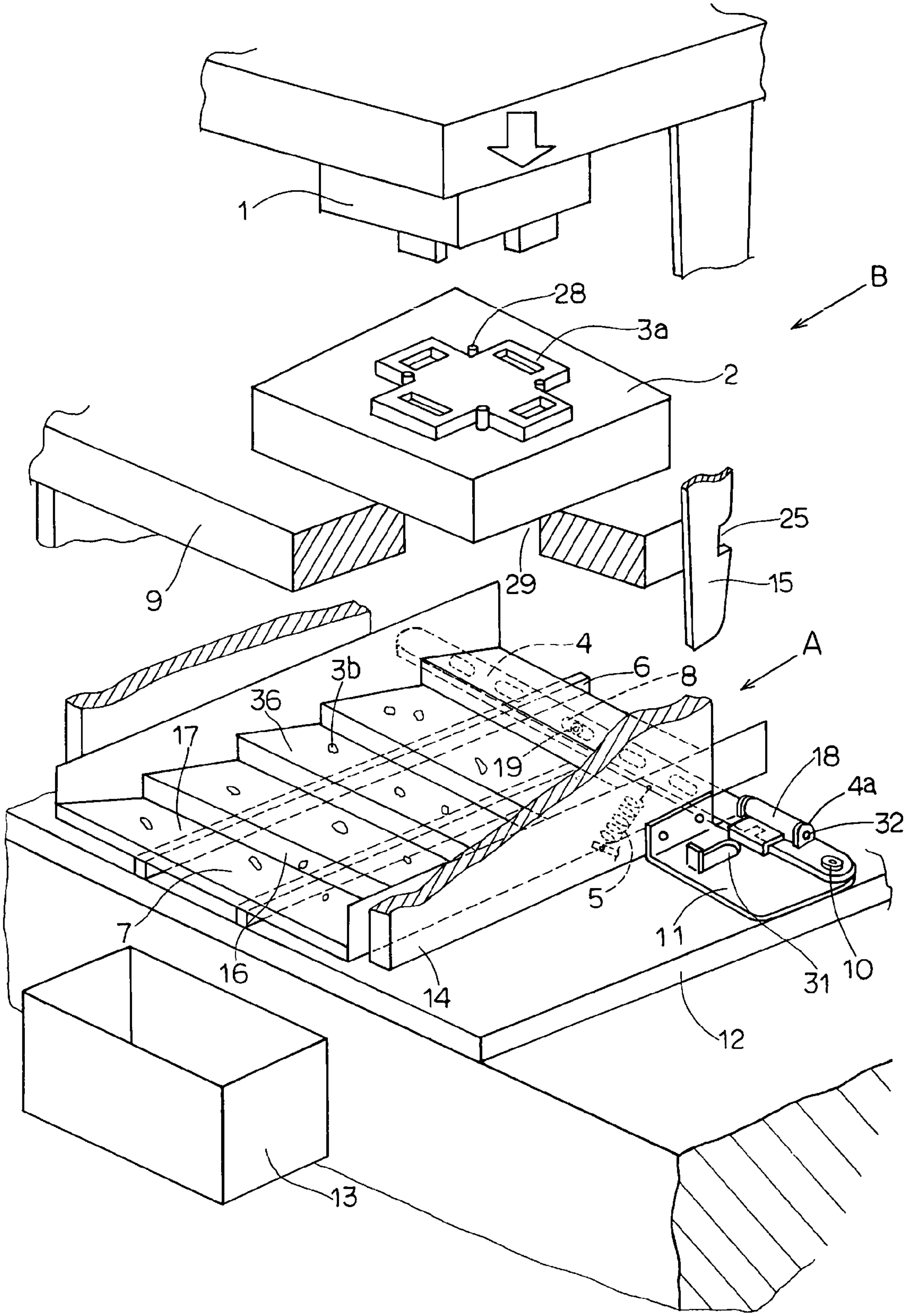
FIG. 1 is a perspective view showing main components of a discharge device for worked material according to a first embodiment of the present invention.
Figure 2:
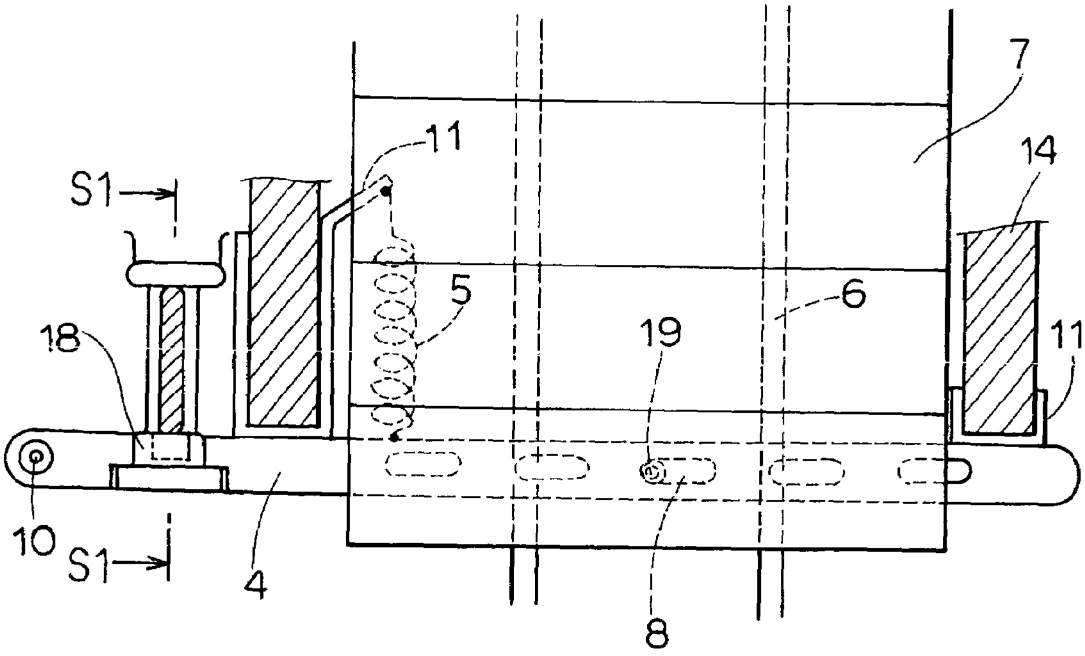
FIG. 2 is a plan view of a chute of the discharge device for worked material according to the first embodiment of the present invention, showing the chute in its initial position.

Preferred embodiments of the present invention will now be described with reference to the attached drawings. Firstly, the description is directed to a first embodiment.

With reference to FIGS. 1 to 9, there is shown a discharge device for worked material (hereinafter simply referred to as a discharge device) according to the first embodiment as designated generally with reference alphabet "A", which is disposed below a press machine B for applying press working to raw material (e.g., predetermined size of steel sheet) to form a work 3*a*, and which is operable to discharge pieces of scrap 3*b* (worked material) that have been produced from the press working.

A detailed configuration of the press machine B will now be described. The press machine B comprises a lower die 2 fixedly secured to a support table 9 and an upper die 1 operatively arranged above the lower die 2 so as to be movable up and down in a vertical direction. The support table 9 extends over a base 12 with a pair of side-walls 14 interposed therebetween, which side-walls 14 stand upright on a top surface of the base 12 in parallel with and spaced apart from each other. An opening 29 having a rectangular shape in plan view is formed in a central portion of the support table 9 penetrating through both of the top and the bottom surfaces of the support table 9. The lower die 2 is mounted on a peripheral edge surrounding the opening 29 of the support table 9. The lower die 2 has a rectangular shape in plan view. Four positioning pins 28 for positioning a raw material are detachably attached to the lower die 2 in its portions surrounding an area opposing to the opening 29 of the support table 9.

The upper die 1 is driven upward and downward at a predetermined speed in a predetermined stroke by a drive means, though not shown. Thus, the material loaded on the lower die 2 is stamped to form the work 3*a* by the reciprocating motion of the upper die 1, with a part thereof producing the resultant scrap 3*b*.

Further, a plate-shaped cam member 15 suspends from the upper die 1 in a lateral portion thereof, which is adapted to move upward and downward together with the upper die 1. A bottom end portion of the cam member 15 is reduced in its width gradually toward the bottom end thereof.

The above-mentioned discharge device A will now be described in detail.

The discharge device A is arranged Just below the lower die 2 and comprises a chute 7 to receive the scrap 3*b* produced in the press working, a lever 4 operable to cause the chute 7 to move forward in a discharging direction of the scrap 3*b* and backward in a direction opposite to said discharging direction, and a coil spring 5 for biasing the lever 4 always toward the side wall 14 side.

The chute 7 is operatively supported over the horizontal base 12 with two parallel rails 6 on the base 12 interposed therebetween so as to be movable forward and backward. Both of the rails 6 are disposed between the side-walls 14 on the top surface of the base 12. Thus, the chute 7 is also placed between the two side-walls 14. Height of an accommodation space for the discharge device A defined below the lower die 2 (i.e., the height measured from the base 12 to the support table 9) is determined in dependence on the height of the side-wall 14.

The chute 7 has substantially an elongated box-like configuration. Specifically, the chute 7 includes a substantially rectangular receiving plate 71 made of metal sheet formed into a profile of steps having a predetermined width and length in plan view, and a pair of side plates 72 fixedly attached to the receiving plate 71 in its both lateral ends and standing upright therefrom to define a predetermined height. It is to be understood that the receiving plate 71 is open in the longitudinal both ends.

The receiving plate 71 having the step-like profile includes a plurality of receiving surfaces 17, each inclined upward by a predetermined-angle relative to the horizontal rails 6 along the discharging direction of the scrap 3*b* (X1 direction in FIG. 9), and a plurality of hit walls 16, each connecting an upper end of each receiving surface 17 to a bottom end of an adjacent receiving surface 17 along a vertical direction. Specifically, the receiving surfaces 17 and the hit walls 16 are alternately arranged to define a bent, which allows said scrap 3*b* to be discharged in one longitudinal end side of the receiving plate 71.

The lever 4 (follower member) is a long and narrow metal plate. The lever 4 is operatively supported at its root portion via a bracket 11 on the base 12 by means of a pin 10 extending vertically along its axial line serving as a supporting point for the lever 4 so as to be swingable around the pin 10. The lever 4 is disposed under the chute 7 in a location opposite to the discharging side of the scrap 3*b*. The above-mentioned coil spring 5 extends horizontally between a vicinity of the root portion of the lever 4 and the side-wall 14 located in the a total of five elongated holes 8 are arranged in the lever 4 with a certain pitch from each other in an intermediate zone of its width direction excluding the root portion of the lever 4. The longitudinal direction of each hole 8 is in conformity to the longitudinal direction of the lever 4.

A pin 19 extruding from a bottom surface of the receiving plate 71 of the chute 7 is loosely inserted into the third elongated hole 8 counted from the root side of the lever 4. Accordingly, if the lever 4 is rotated around the pin 10 as the center of rotation within the horizontal plane, the chute 7 is moved forward and backward along its longitudinal direction. The specific elongated hole 8 among those five elongated holes 8 into which the pin 19 is inserted may be appropriately selected in response to respective cases, including a case where the position of the chute 7 between the rails 6 is to be changed and the case where a plurality of chutes 7 are disposed between the rails 6. Through holes 31 having a rectangular shape in plan view are coaxially formed through the bracket 11 and the corresponding portion of the base 12 to which the bracket 11 is secured. The location of the through holes 31 to be formed is defined just below the above-described cam member 15. In this configuration, during the upper die 1 moving downward, the bottom end portion of the cam member 15 is inserted loosely into the through holes 31.

A lever actuating member 18 is operatively mounted on the root side of the lever 4 at a location proximal to said through hole 31 so as to be swingable up and down around a pin 32 whose axial line is in parallel with the longitudinal direction of the lever 4. The lever actuating member 18 is made of thin metal sheet and arranged operatively traversing across the lever 4 so as to be swingable by a certain angle around the pin 32 having the horizontal axial line. The pin 32 is pivotally supported on the root side of the lever 4 between a pair of protrusions 4*a* spaced apart in the end of the lever 4 at a location opposite to the through hole 31. A free end of the lever actuating member 18 is positioned to face to said through holes 31 and adapted to come into contact with an edge cam surface of the cam member 15 when the end portion (bottom end portion) of said cam member 15 is loosely inserted into the through hole 31. The bottom end portion of the cam member 15 is tapered toward the end and a notch 25 having a predetermined depth is formed in the cam member 15 at a predetermined level. Owing to this configuration, as the lowering cam member 15 comes into contact with the lever actuating member 18 and operatively presses against the lever actuating member 18, the lever 4 is rotated against the spring force from the coil spring 5 by a specified angle toward the direction opposite to the biasing direction of the coil spring 5. This causes the pulling of the chute 7 via the pin 19 inserted in the elongated hole 8 and the chute 7 is moved gradually toward the side opposite to the discharging side of the scrap 3*b*. Subsequently, when the cam member 15 has been lowered to a predetermined level, the lever actuating member 18 is suddenly engaged in the notch 25 with the aid of the spring force from the coil spring 5. At the same time with this engagement, the lever 4 is rotated at a high speed toward the discharging side of the scrap 3*b*. In conjunction with this, the chute 7 is also moved via the pin 19 inserted in the elongated hole 8 toward the discharging side of the scrap 3*b*. In this operation, the moving rate of the chute 7 has been designed such that a force acting on the scrap 3*b* on the chute 7 is greater than a frictional force acting between the scrap 3*b* and the chute 7 at a moment of subsequent stopping of the chute 7. Consequently, the scrap 3*b* is due to be discharged with the aid of its inertia force from the open end in the longitudinal direction of the chute 7 to the outside of the press working apparatus (into a recovery box 13).

An operation of the press machine B will now be described.

The upper die 1 is moved up and down at a predetermined speed between an upper dead point and a lower dead point of its stroke by a drive source, though not shown. At that time, the upper die 1 is lowered onto the lower die 2 on which the material has been loaded in position, where both dies 1 and 2 co-operate to apply the press working to the material so as to be formed into a predetermined configuration. This operation produces the work 3*a* and at the same time the scrap 3*b* of no use (swarf, chip). The work 3*a* is removed from the lower die 2 automatically or manually. To supply another piece of material onto the lower die 2, the material may be supplied also either automatically or manually.

On the other hand, the scrap 3*b* drops through the opening 29 of the lower die 2 down onto the receiving surface 17 of the chute 7. At that time, the chute 7 is positioned just below the opening 29 of the lower die 2 (FIG. 1).

Turning now to FIGS. 1 to 8, an operation of the discharge device A will be described.

Figure 7:
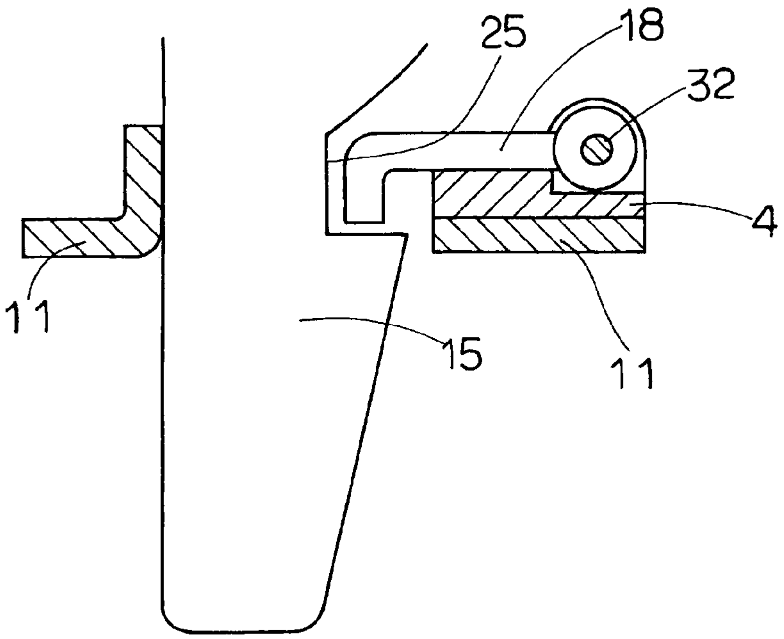
FIG. 7 is an enlarged sectional view along the S3—S3 line of FIG. 6, showing the cam member having moved down to a lower dead point.
Figure 8:
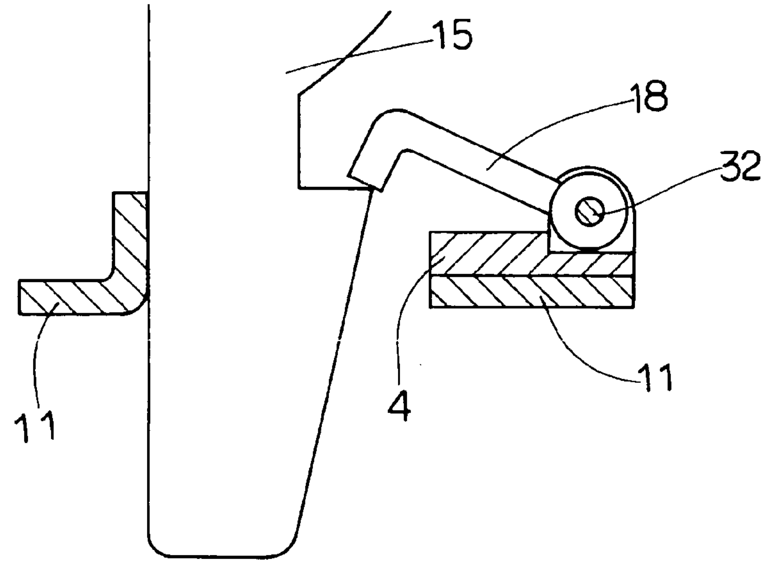
FIG. 8 is an enlarged sectional view along the S3—S3 line of FIG. 6, showing the cam member having moved up to a predetermined level.
Figure 9:
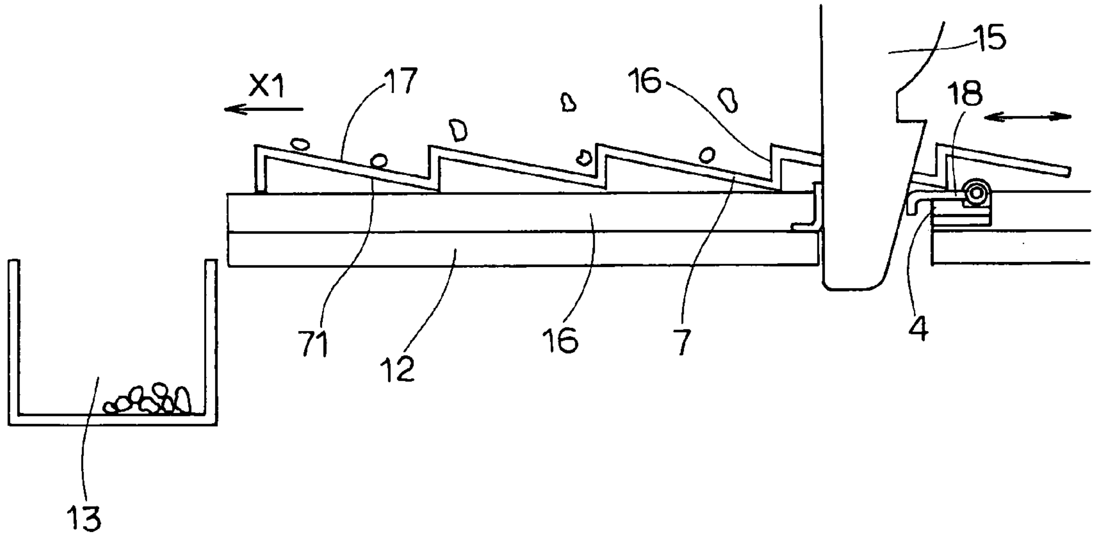
FIG. 9 is a side elevational view showing the chute of the discharge device for worked material according to the first embodiment of the present invention.

When the upper die 2 has been lowered and co-operated with the lower die 2 to apply the press working to the material to be formed into the work 3*a*, the chute 7 is in its initial position as shown in FIG. 7. In the initial position of the chute 7, the lever 4 is in contact with the side-wall (stopper) 14 by the spring force from the coil spring 5. As it is, the chute 7 is to receive the pieces of scrap 3*b* on a plurality of receiving surfaces 17 thereof respectively.

Figure 3:
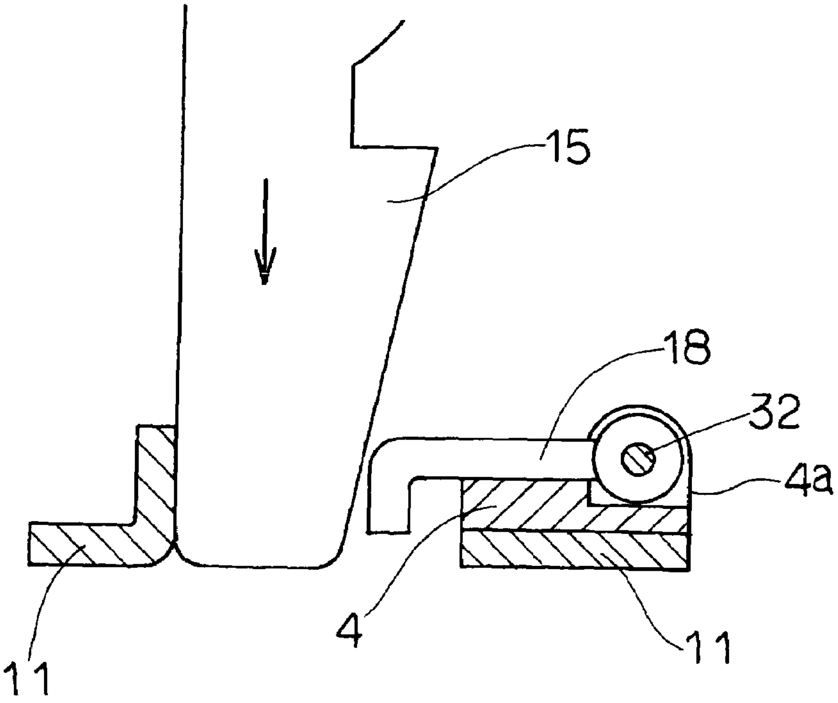
FIG. 3 is an enlarged sectional view along the S1—S1 line of FIG. 2, showing a cam member having moved down into contact with a lever actuating member in the discharge device for worked material according to the first embodiment of the present invention.

As the upper die 1 is further lowered, the cam member 15 is also lowered in conjunction with the lowering operation of the upper die 1 to bring the bottom end of the cam member 15 into contact with the lever actuating member 18. FIG. 3 shows the cam member 15 that has been lowered and brought into contact with the lever actuating member 18.

Figure 4:
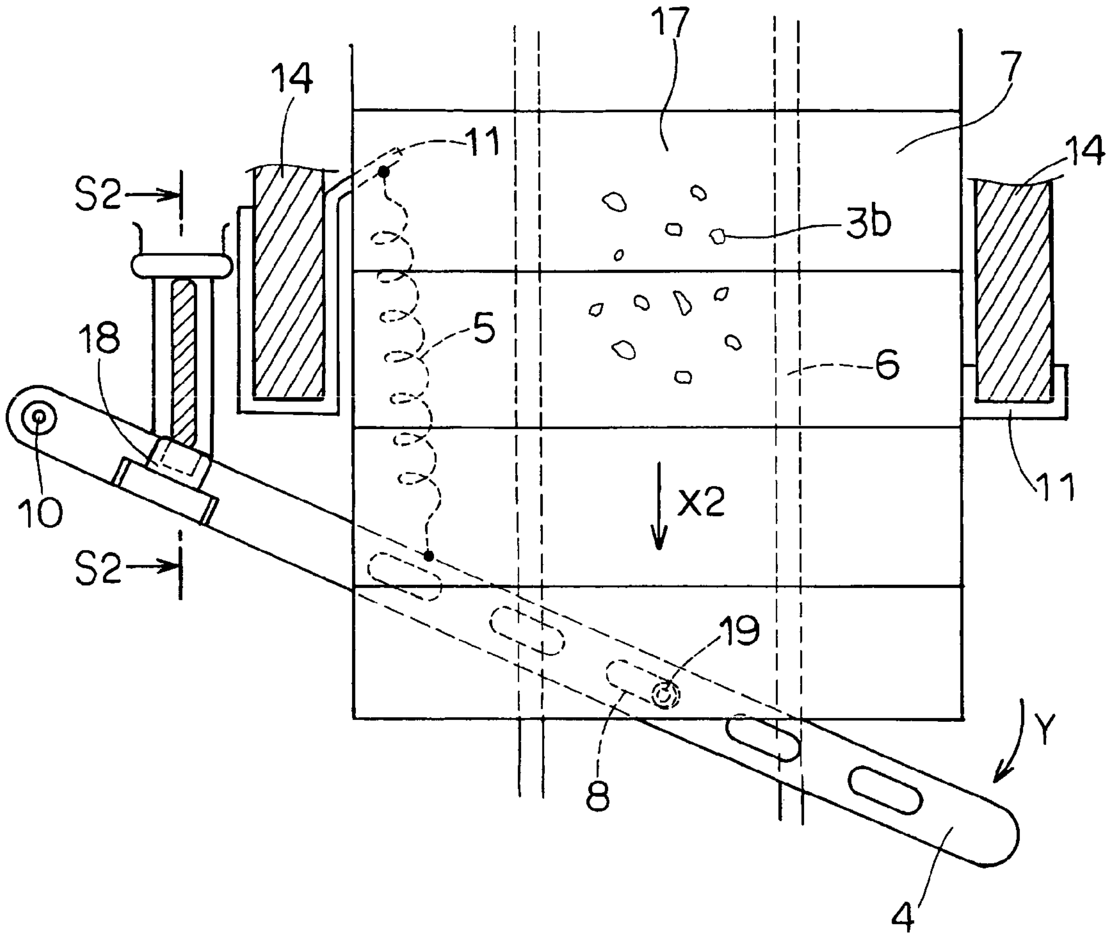
FIG. 4 is a plan view of the chute having moved in one direction from the initial position to a forwardly moved position in the discharge device for worked material according to the first embodiment of the present invention.

Subsequently, as the upper die 1 and thus the cam member 15 are moved down, the cam surface of the cam member 15 is gradually pressed against the lever actuating member 18. This causes the lever 4 to move against the spring force from the coil spring 5 and rotate around the pin 10 as the center by a predetermined angle toward a direction opposite to that of the biasing force from the coil spring 5 (FIG. 4). Consequently, the chute 7 is gradually pulled via the pin 19 inserted in the elongated hole 8 by a predetermined distance along the direction (X2 direction) opposite to the discharging direction of the scrap 3*b*. FIG. 4 shows the chute 7 that has been moved in one direction from the initial position to the forwardly moved position. At that time, the coil spring 5 has been tensioned to its maximum. The moving speed of the chute 7 depends on the lowering speed of the cam member 15. Specifically, the lever 4 has such a geometry, in which the pin 10 serves as a supporting point, the cam contact area in the lever actuating member 18 serves as a force application point, and the pin 19 inserted in the elongated hole 8 of the chute 7 serves as a point of application. Accordingly, the rotational force of the lever 4 applied by the cam member 15 is amplified and then transmitted to the chute 7. The traveling distance of the chute 7 is longer than the traveling distance of the lever actuating member 18 forced by the cam member 15.

Figure 5:
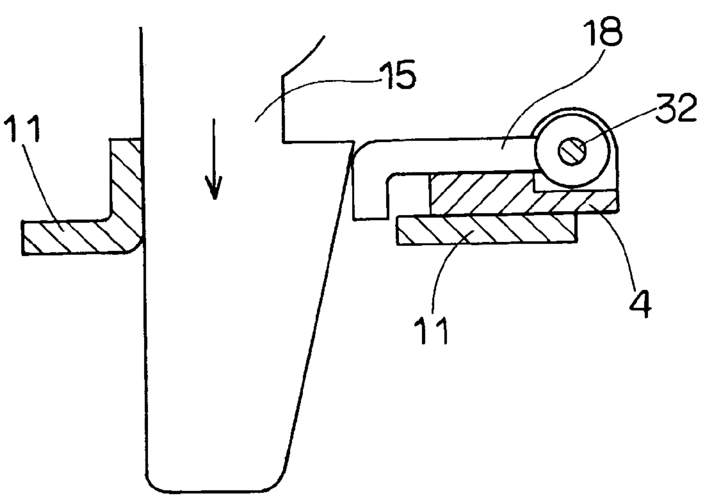
FIG. 5 is an enlarged sectional view along the S2—S2 line of FIG. 4, showing an engagement between the cam member and the lever actuating member, where the cam member is moving down to bias the lever actuating member in the discharge device for worked material according to the first embodiment of the present invention.

FIG. 5 shows a state of engagement between the cam member 15 and the lever actuating member 18 when the cam member 15 is lowered to bias the lever actuating ember 18. At this moment, the chute 7 is in the position as shown in FIG. 4.

Figure 6:
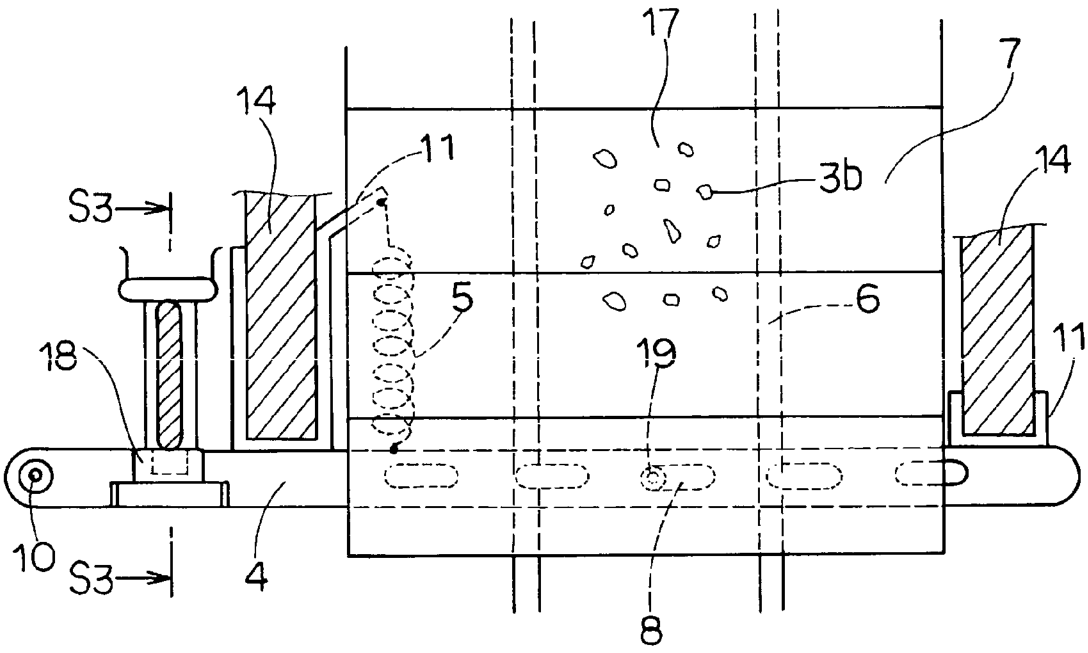
FIG. 6 is a plan view of the chute having moved from the forwardly moved position back to the initial position in the discharge device for worked material according to the first embodiment of the present invention.

Then, when the upper die 1 has been lowered to its lower dead end, the engagement between the cam member 15 and the lever actuating member 18 is carried on in the following manner. Specifically, at the time in FIG. 7, the lever actuating member 18 is inserted into the notch 25. As a result, the chute 7 as shown in FIG. 4 moves from the forwardly moved position back to the initial position as shown in FIG. 6 at a predetermined speed. This is because the lever 4 is biased by the spring force from the coil spring 5. The sliding motion of the chute 7 is terminated by the abutment of the lever 7 with the side-wall 14. At that time, those pieces of scrap 3*b* carried on respective receiving surfaces 17 are subject to the predetermined force from the movement of the chute 7, which force is greater than the frictional force acting between the scrap 3*b* and the receiving surface 17 of the chute 7. Owing to this fact, the scrap 3*b* can be discharged with the aid of the inertia force from the chute 7 to the outside of the press working apparatus (into the recovery box 13).

In the next step, as the upper die 1 is move up, the cam member 15 is also moved up in conjunction with the upward movement of the upper die 1. During this operation, when the cam member 15 has been moved up to a predetermined level, a surface of the notch 25 comes in abutment with the downwardly bent end of the lever actuating member 18. This causes the lever actuating member 18 to rotate upwardly by a predetermined angle around the pin 32 within a vertical plane. It is to be understood that the lever actuating member 18 would not interfere with the upward movement of the cam member 15. It is also to be understood that the lever actuating member 18 is biased by the spring force from a small coil spring interlocked with a pin, though not shown, in a direction to return back to its initial position, where it extends over the lever 4.

Thus, during the up and down movement of the upper die 1 in association with the cam member 15 being repeated, the reciprocating motion of the chute 7 within the horizontal plane is repeated in synchronization with said up and down movement.

In this operation, during the forward and backward movement of the chute 7, the scrap 3*b* hits on the hit wall 16 of the chute 7. The scrap 3*b* hitting on the hit wall 16 is prohibited in its further movement toward the hit wall 16 side. Accordingly, as the chute 7 makes a few times of reciprocating motion, the scrap 3*b* is advanced on each receiving surface 17 toward the discharging direction (FIG. 9) and ultimately discharged out of the press working apparatus A to be recovered in the recovery box 13.

Turning now to FIGS. 10 to 13, a second embodiment of the present invention will be described. A discharge device A1 for worked material according to the second embodiment is similar to the discharge device A of the first embodiment with an exception of some modifications added thereto as follows.

Figure 10:
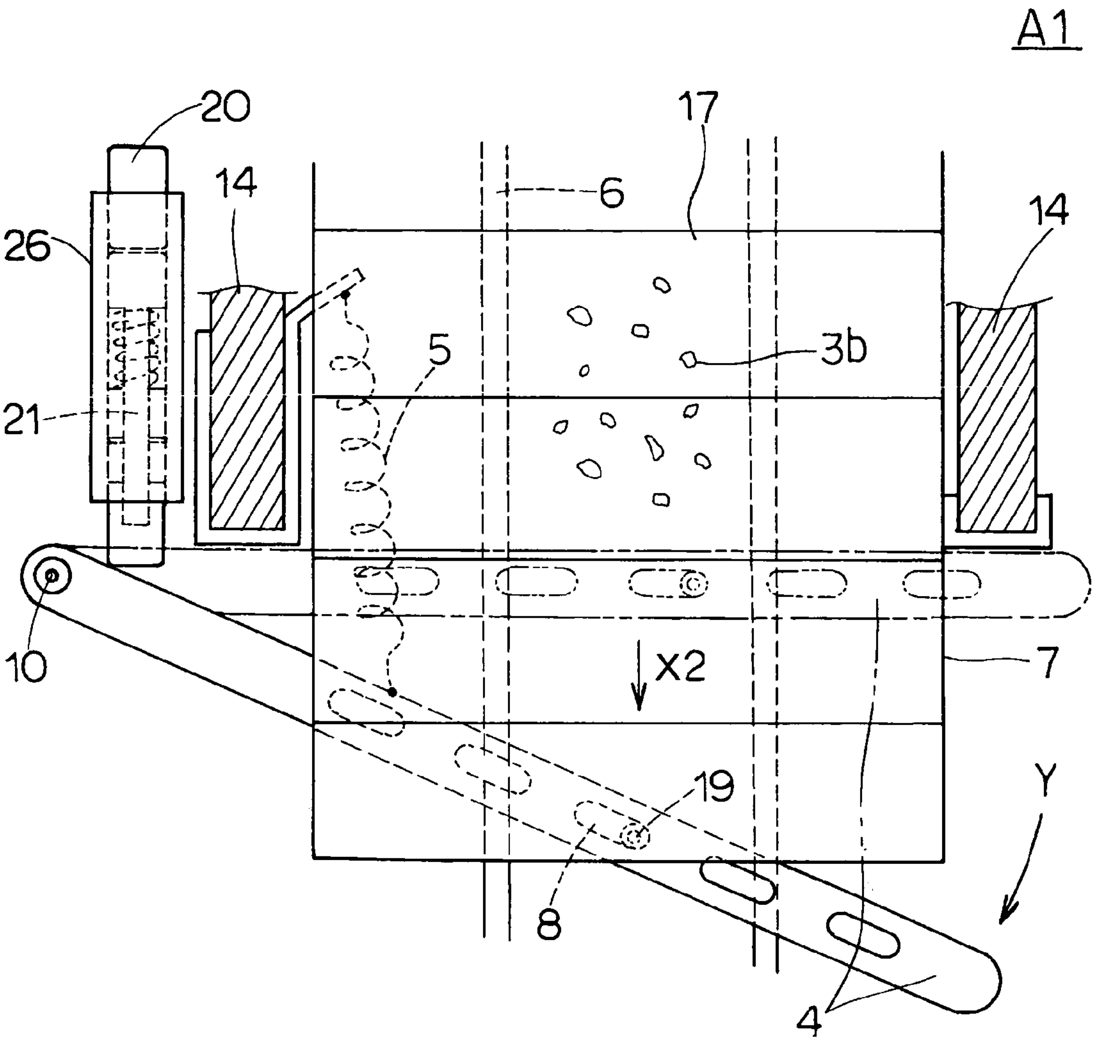
FIG. 10 is a plan view of main components of a discharge device for worked material according to a second embodiment of the present invention.

Specifically, the discharge device A1 represents an example characterized in that the lever 4 is not driven directly by the cam member 15 but driven indirectly. As shown in FIG. 10, a cam mechanism 26 is disposed in a location proximal to the root side of the lever 4 in parallel with the chute 7.

Figure 11:
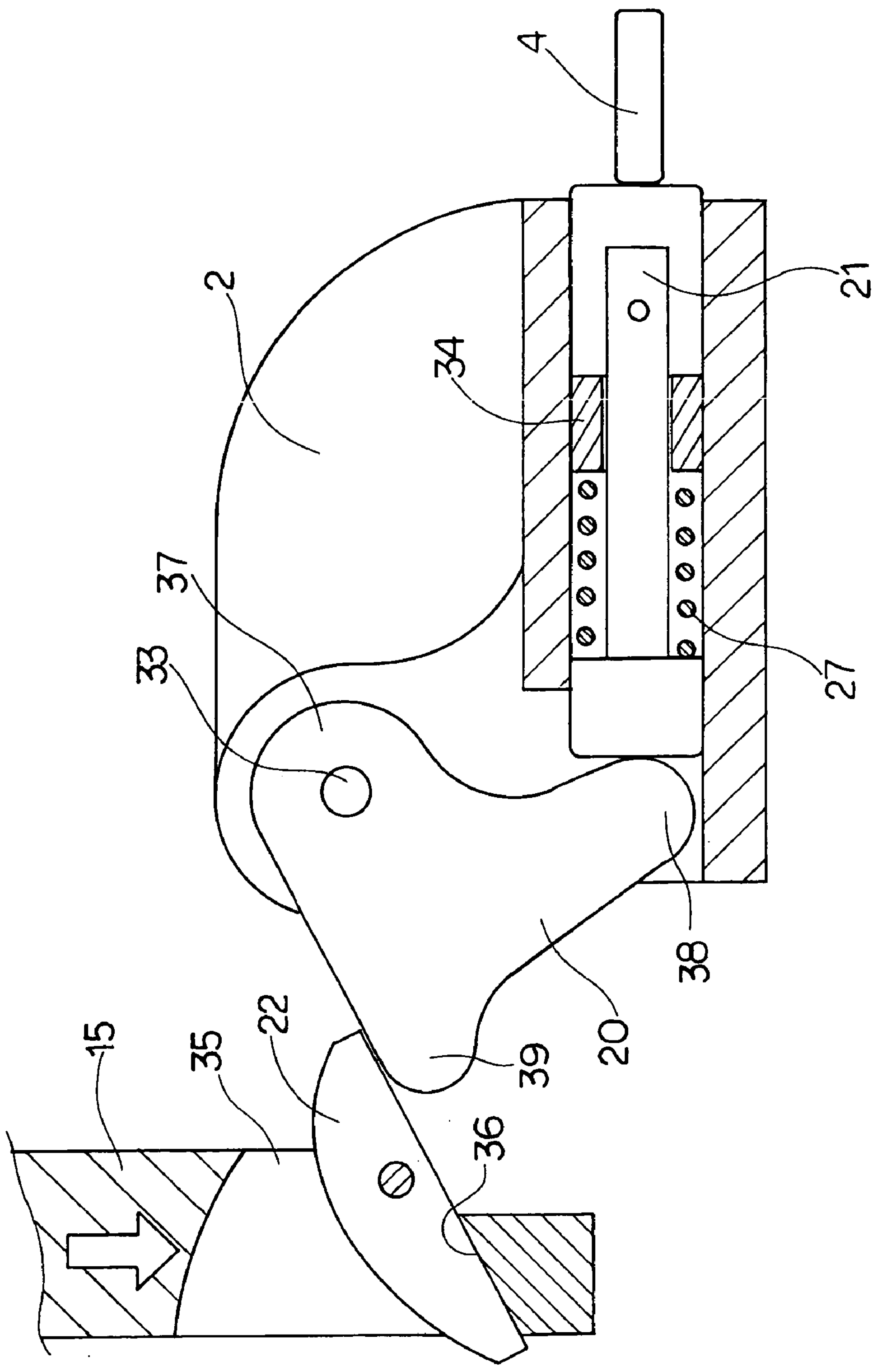
FIG. 11 is a sectional view showing a cam plate member having come into contact with a cam of a cam mechanism in the discharge device for worked material according to the second embodiment of the present invention.

As shown in FIG. 11, the cam mechanism 26 comprises a main body fixed onto the base 12, a slider 21 for driving the lever 4, a cam 20 adapted to come into contact with the slider 21 to rotate the lever 4, and a return spring 27 of the slider 21. The cam 20 defines a substantially triangular shape. A first vertex 37 of the cam 20 is pivotally supported in an upper portion of the main body of the cam mechanism 26 via a pin 33. The slider 21 is supported in the main body such that a second vertex 38 of the cam 20 can be brought into contact with the slider 21 to slidably move the slider 21 in a substantially horizontal plane. The return spring 27 is always basing the slider 21 with a certain force toward the cam 20 side.

On the other hand, a cam member 15 suspends from the upper die 1 just over a third vertex 39 of the cam 20. A semi-barrel shaped cam plate 22 is pivotally mounted on a bottom end of the cam member 15 so as to be rotatable within a vertical plane, in which the cam plate 22 is adapted to come into contact with and press against the third vertex 39 of the cam 20. The cam plate 22 is prohibited from rotating to the anti-clockwise direction as seen in FIG. 11 by the receiving surface 36. The cam plate 22 is allowed to rotate freely in clockwise direction in FIG. 11. Specifically, an opening 35 of desired size and shape is formed in the bottom end of the cam member 15 in which the cam plate 22 is mounted, and said opening 35 include a bearing surface 36.

With reference to FIGS. 10 to 13, an operation of a discharge device A1 according to the second embodiment will now be described. In a condition of the upper die 1 having been moved up, the lever 4 is in its stationary position (indicated by the dashed line) as shown in FIG. 10, and the chute 7 is in its initial position.

Starting from this condition, the upper die 1 lowers down and co-works with the lower die 2 to apply the press working to the material. The scrap 3*b* that has been simultaneously produced drops onto each receiving surface 17 of the chute 7.

As the upper die 1 lowers down further, the cam member 15 is also lowered, so that the cam plate 22 is brought into contact with the third vertex 39 of the cam 20 (FIG. 11).

Figure 12:
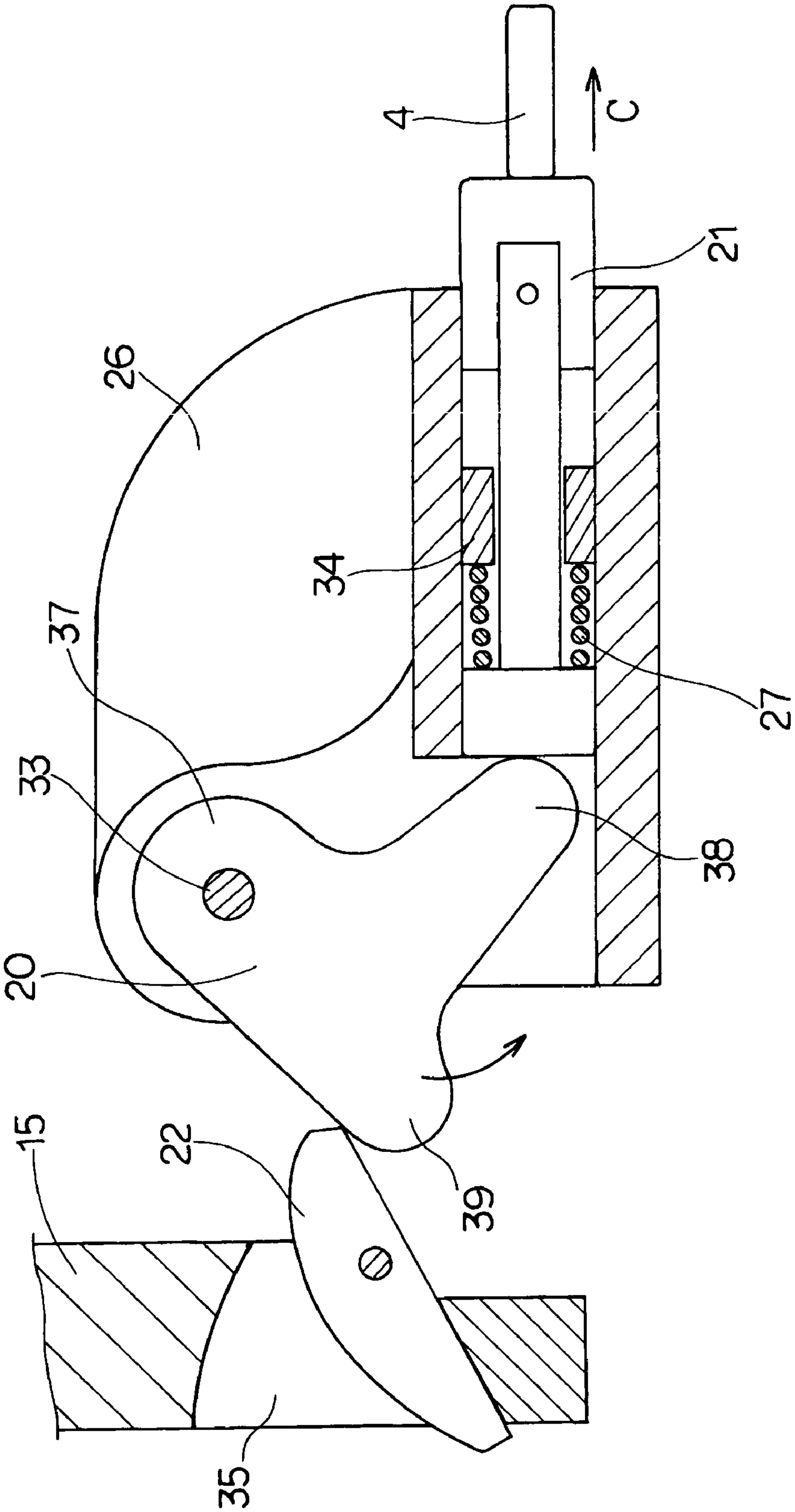
FIG. 12 is a sectional view showing the cam plate member having been pressed against the cam of the cam mechanism in the discharge device for worked material according to the second embodiment of the present invention.

As the cam member 15 is lowered further, the cam plate 22 causes the cam 20 to rotate around the pin 33 as the center in an anti-clockwise direction in the drawing by a predetermined angle (FIG. 12). As a result, the slider 21 is protruded by a predetermined stroke in the direction toward the lever 4 side (C direction) against the spring force from the return spring 27. This causes the lever 4 to rotate around the pin 10 as the center in the Y direction opposite to the discharging direction of the scrap 3*b* (in a clockwise direction in FIG. 10) by a predetermined angle. Consequently, the chute 7 travels in the X2 direction by a predetermined distance. In FIG. 10, the lever 4 indicated by the solid line shows its position where the lever 4 has been moved forward in one direction from the initial position of the chute 7.

Figure 13:
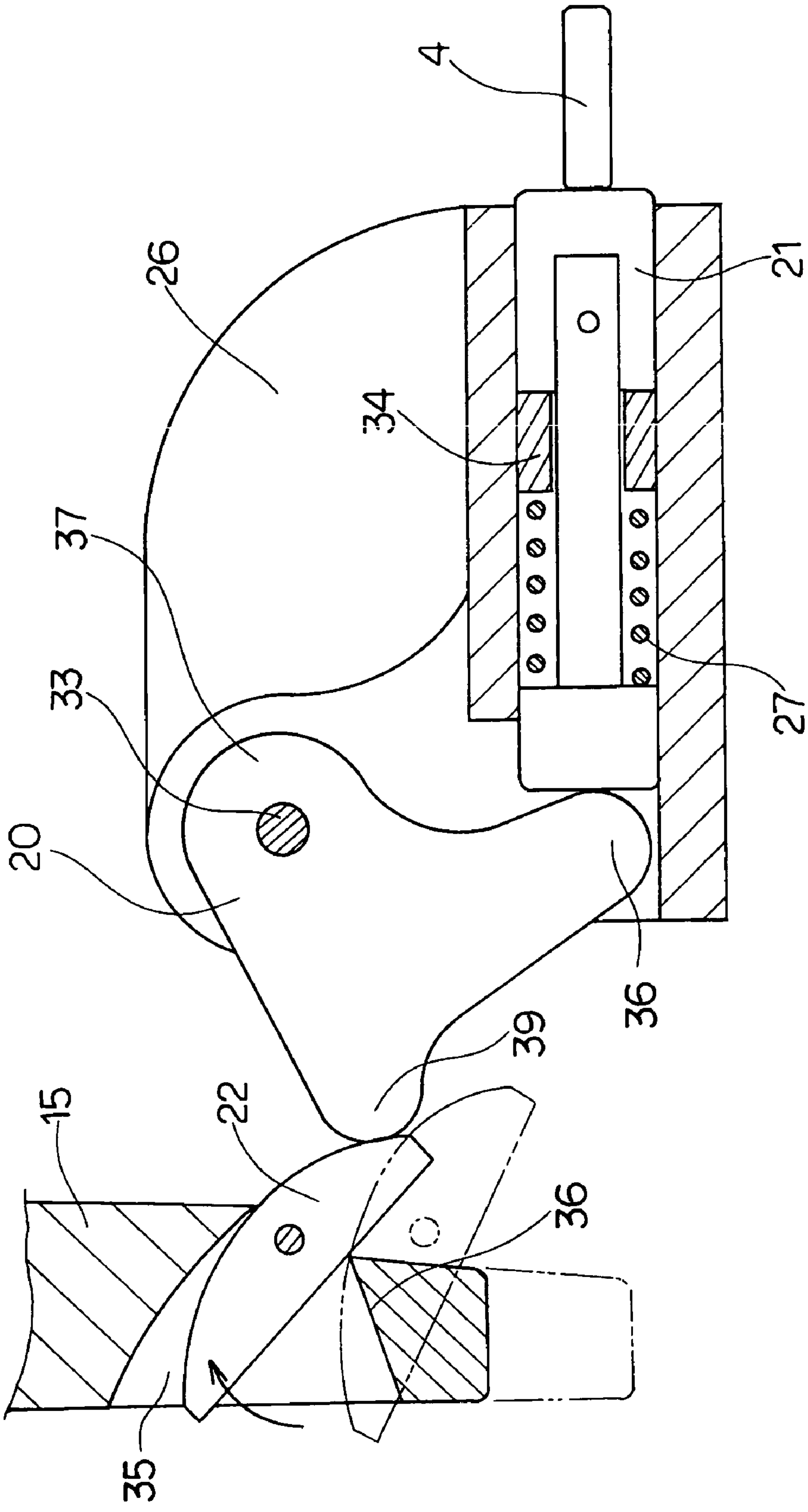
FIG. 13 is a sectional view showing an engagement between a cam member and the cam, where the cam member is moving down to bias the can in the discharge device for worked material according to the second embodiment of the present invention.

The further lowering of the cam member 15 disengages the cam plate 22 from the cam 20 (as indicated by the imaginary line in FIG. 13). Specifically, when the upper die 1 has been lowered to its lower dead point, the cam member 15 is in the position indicated by the chain double-dashed line, where the contact engagement between the cam plate 22 and the cam 20 is no more effective. Consequently, the slider 21 is retracted by the spring force of the return spring 27 to come into contact with a stopper 34 of the main body of the cam mechanism 26. Thus, a front-end portion of the slider 21 is disengaged from a side face of the lever 4 in its root portion. As a result, with the aid of the spring force of the coil spring 5, the lever 4 is rotated at a predetermined speed in the direction opposite to the Y direction to be brought into contact with the side-walls 14, where it is stopped. On the other hand, the chute 7 together with the lever 4 slides along the rails 6 in the direction opposite to the X2 direction until the chute 7 is stopped by the contact of the lever 4 with the side-walls 14 (indicated by the chain two-dashed line in FIG. 10). Consequently, the scrap 3*b* that has dropped on the receiving surface 17 of the chute 7 is subject to a specified inertia force and ultimately discharged out of the chute, as is the case with the first embodiment.

Further, as shown in FIG. 13, subsequently as the cam member 15 moves upward integrally with the upper die 1, a curved upper surface of the cam plate 22 comes into contact with the third vertex 39 of the cam 20 from below. FIG. 13 shows the state of engagement therebetween at that time. As shown in FIG. 13, the cam plate 22 is rotated in the direction indicated by the arrow (clockwise direction in the drawing). Owing to this, the upward movement of the cam member 15 is not interfered therewith.

In an effect from the above-described configuration of the discharge device A1 according to the second embodiment, in which the cam mechanism 26 has been employed to provide the indirect driving of the lever 4, the degree of freedom in modifying the mounting location of the cam member 15 can be increased.

Figure 14:
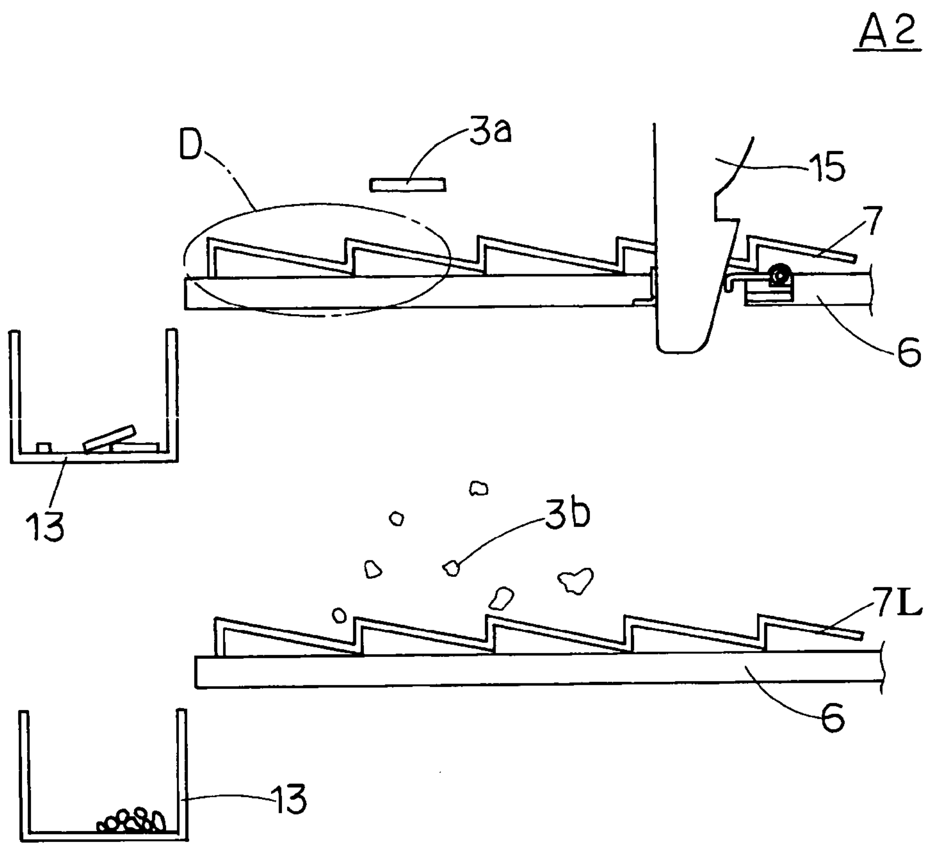
FIG. 14 is a side elevational view of a discharge device for worked material according to a third embodiment of the present invention.
Figure 15:
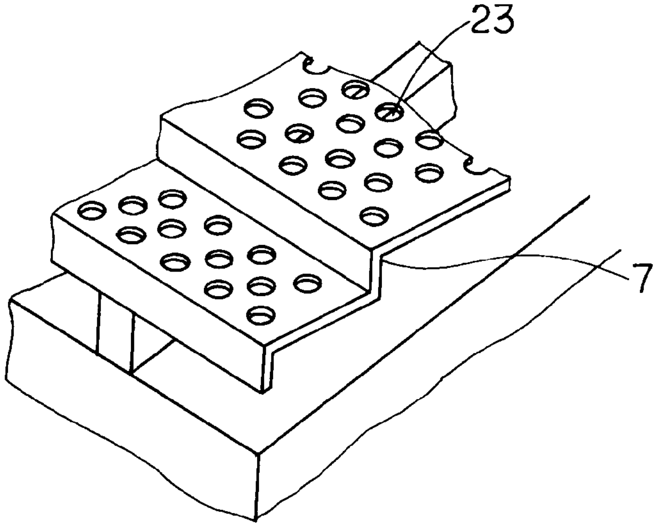
FIG. 15 is an enlarged perspective view of a portion marked with D in FIG. 14.

Turning now to FIGS. 14 and 15, a third embodiment of the present invention will be described.

A discharge device A2 for worked material according to the third embodiment is similar to the discharge device A of the first embodiment with an exception of some modifications added thereto as follows.

Specifically, as shown in FIG. 14, a lower chute 7L movable in the forward and backward directions in a substantially horizontal plane is disposed below the chute 7. A drive means for the lower chute 7L, though not shown, is actuated associatively with the lever 4 of the chute 7 located above the lower chute 7L and adapted to drive the lower chute 7L to move forward and backward in the substantially horizontal plane in synchronization with the upper chute 7. Further, as shown in FIG. 15, in this configuration, each of the receiving surfaces 17 of the upper chute 7 includes a number of through-holes 23 that are, for example, larger in size than the scrap 3*b* but smaller than the work 3*a*. The geometry of the through-hole 23 may be circular or elongated circular shape, for example. Those chutes 7 and 7L have employed the receiving surfaces 17 that are inclined upward by a predetermined angle relative to the substantially horizontal planes in which the chutes 7 and 7L move forward and backward.

Accordingly, in the discharge device for worked material A2, those pieces of scrap 3*b* that are smaller in size than the through-holes 23 drop through the through-holes 23 of the upper chute 7 down onto the receiving surfaces 17 of the lower chute 7L. Subsequently, with the aid of the reciprocating forward and backward movement of the lower chute 7L, those pieces of scrap 3*b* can be discharged out of a press working apparatus B. On the other hand, the work 3*a* produced from the press working is received in the upper chute 7 and discharged out of the press working apparatus B.

In an effect from the above-described modified configuration, the discharged device A2 for worked material allows for the worked material to be sorted into the work 3*a* and the scrap 3*b* which are discharged separately from each other.

Other parts of the configuration, operation and effect of the third embodiment are the same as those in the first embodiment, and accordingly the further description will be herein omitted.

Figure 16:
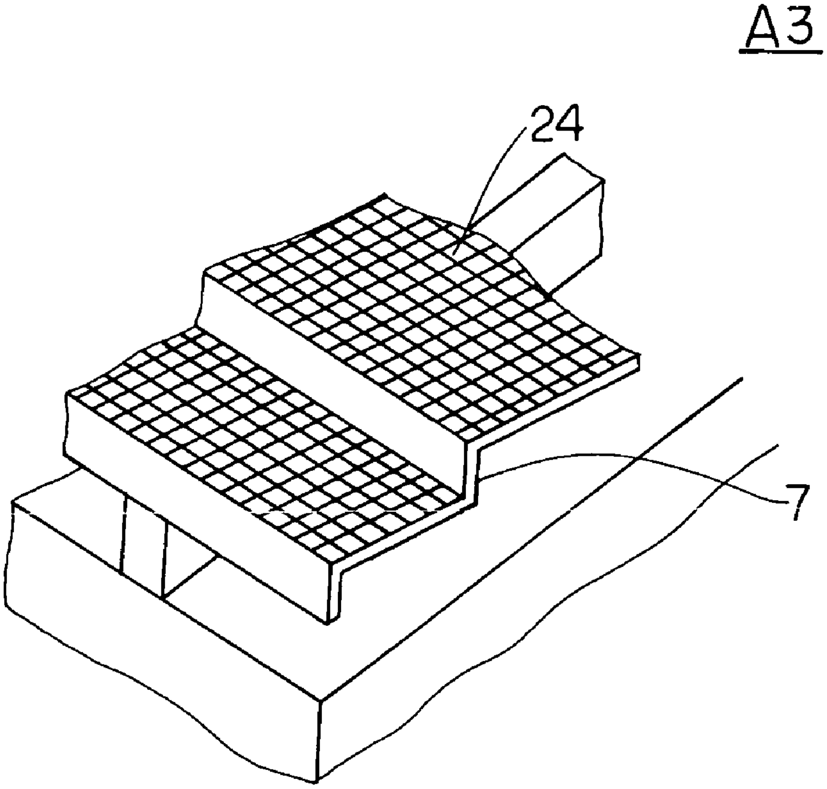
FIG. 16 is an enlarged perspective view similar to FIG. 15, showing a stepped portion of a chute of a discharge device for worked material according to a fourth embodiment of the present invention.

With reference to FIG. 16, a fourth embodiment of the present invention will now be described.

As shown in FIG. 16, a discharge device A3 for worked material according to the fourth embodiment is an example similar to the discharge device A2 for worked material of the third embodiment with an exception of modification that the receiving surface 17 of the chute 7 includes a mesh with openings each being larger in size than the scrap 3*b* instead of the through-hole 23.

Those piece of scrap 3*b* smaller in size than the opening of the mesh 24 drop through the opening of the mesh 24 down onto the receiving surfaces 17 of the lower chute 7L. Then, the scrap 3*b* is discharged to the outside by the reciprocating motion of the lower chute 7L. On the other hand, the work 3*a* larger in size than the opening of the mesh 24 are received in the upper chute 7 and discharged to the outside in the same manner.

Other parts of the configuration, operation and effect of the fourth embodiment are the same as those in the third embodiment, and accordingly the further description will be herein omitted.

Turning now to FIGS. 17 to 22, a fifth embodiment of the present invention will be described.

As shown in FIGS. 17 to 22, a discharge device A4 for worked material according to the fifth embodiment is another example similar to the discharge device A of the first embodiment with an exception of some modifications added thereto as follows.

Specifically, the discharge device A4 for worked material has employed a configuration, in which the chute 7 is not driven by the cam member 15 via the lever 4 but the chute 7 is instead driven via a cam mechanism 40.

The cam mechanism 40 comprises a cam member 41 fixed to a side face of the upper die 1 by using a screw and a follower member 42 disposed just below the cam member 41 and fixed to a side face of the lower die 2. It is to be understood that the cam member 41 may be fixed to a slide to which the upper die 1 is fixedly secured and the follower member 42 may be fixed to a corresponding location of a bolster to which the lower die 2 is fixedly secured. This arrangement facilitates to cope with any modifications in the dies.

The description will be firstly directed to the cam member 41 in detail.

The cam member 41 includes amounting bracket 43 having a trapezoidal shape in side elevational view attached to an end portion of the upper die 1 defined in its discharging side of the scrap 3*b*. A pair of fixing plates 43*b* is integrally formed in opposite sides of a main part of the mounting bracket 43. Pin holes 43*c* are formed in the respective fixing plates 43*b*. The mounting bracket 43 is fixedly secured to the upper die 1 with pins inserted through the pin holes 43*c*. A pair of short tongues 43*a* for providing a pivot support for a cam body 46 extends downward from a bottom corner of the mounting bracket 43. The cam body 46 comprising a pair of link members 45 spaced apart in the horizontal direction is pivotally supported by the short tongues 43*a* via a cam pivot pin 44 so that the cam body 46 can rotate in a vertical plane. The two pieces of link members 45 in the parallel relationship are integrally assembled with the pins 44 and a pin 47 to define the cam body 46.

The stationary position (reference position) of the cam body 46 where the cam body is ready for the input operation is defined as the position where the both link members 45 are oriented vertically. A horizontal input pin 47 extends horizontally between the front end portions (the bottom ends) of the link members 45. A location in the cam body 46 where the input pin 47 is attached is slightly offset from the position just below the cam pivot pin 44 toward the direction opposite to that of the discharging of the scrap 3*b*.

On the outer surface of the cam pivot pin 44 is installed a coil spring 48 (a cam resilient member) serving to bias always the front end portion of the cam body 46 toward the discharging direction of the scrap 3*b* with respect to its rotational directions of the cam body 46. The coil spring in its one end is fixedly secured to the mounting member 43 and in the other end to one of the link members 45. A stopper 49 is provided in the root portion (the upper end) of the cam body 46 in its discharging side of the scrap 3*b* (the left-hand side seen in FIG. 17) for prohibiting the front end portion of the cam body 46 in the stationary position from rotating toward the discharging direction of the scrap 3*b*. The stopper 49 is formed by bending each of the link members 45 inward at a right angle to define a small protrusion and adapted to interlock with the short tongues 43*a* of the mounting bracket 43.

The follower member 42 will now be described.

The follower member 42 comprises a casing (a follower bracket) 50 defining substantially a pistol-grip-like configuration in side elevational view mounted on an end portion of the lower die 2 in its opposite side with respect to the discharging direction of the scrap 3*b*. An upper opening is formed in an upper portion of the casing 50, which extends from a top surface to an outer surface in an upper end portion thereof. In addition, a lower opening is formed in a lower portion of the casing 50, which extends from a bottom surface to a portion thereof facing to a lower end surface of the lower die 2. Further, a pair of fixing plates 50*a* extending opposite lateral directions from each other is formed in a back plate 51 (disposed in the discharging side of the scrap 3*b*) of the casing 50 in an intermediate portion with respect to its height direction. Holes 50*b* are formed in both fixing plates 50*a*, respectively, and the follower member 42 is fixedly secured to the lower die 2 by means of bolts extending through the holes 50*b*. In a lower end portion of each of side plates 50*d* of the casing 50 is formed an elongated hole 50*c* extending along a length of a horizontal chute 7A, respectively.

Figure 19:
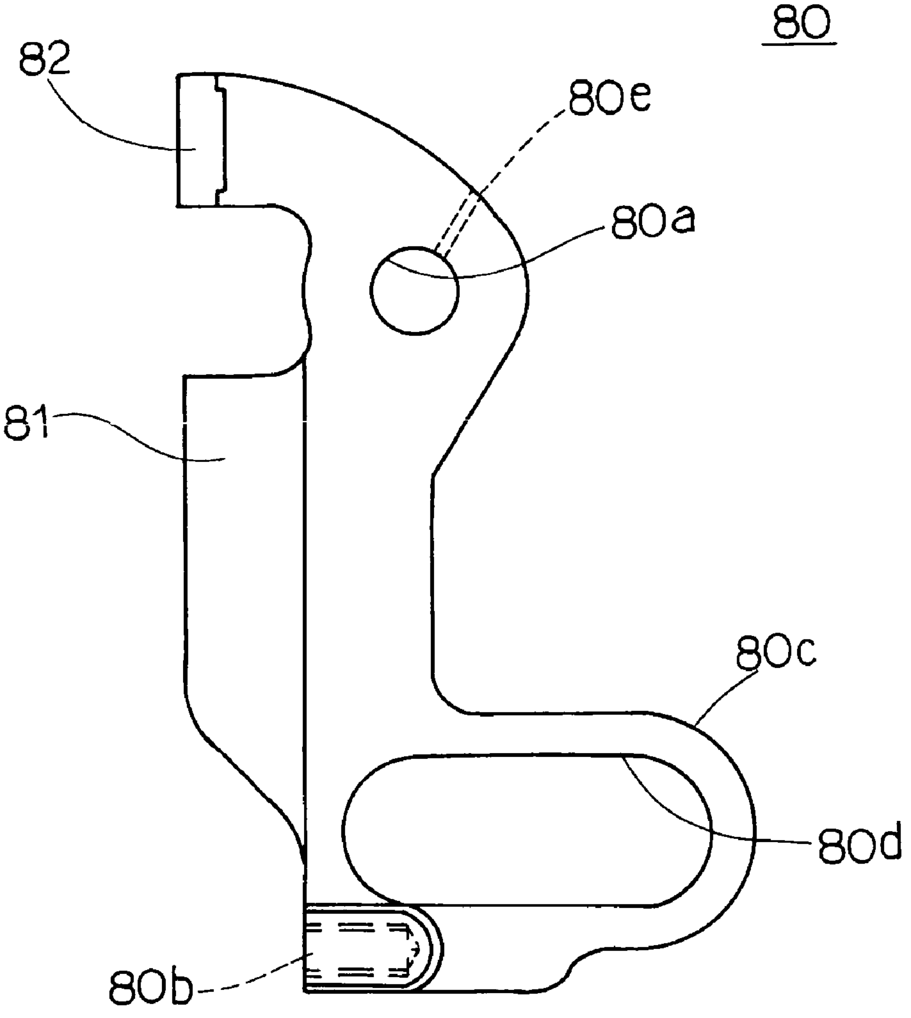
FIG. 19 is a side elevational view of a core element incorporated in a follower member of the discharge device for worked material according the fifth embodiment of the present invention.
Figure 20:
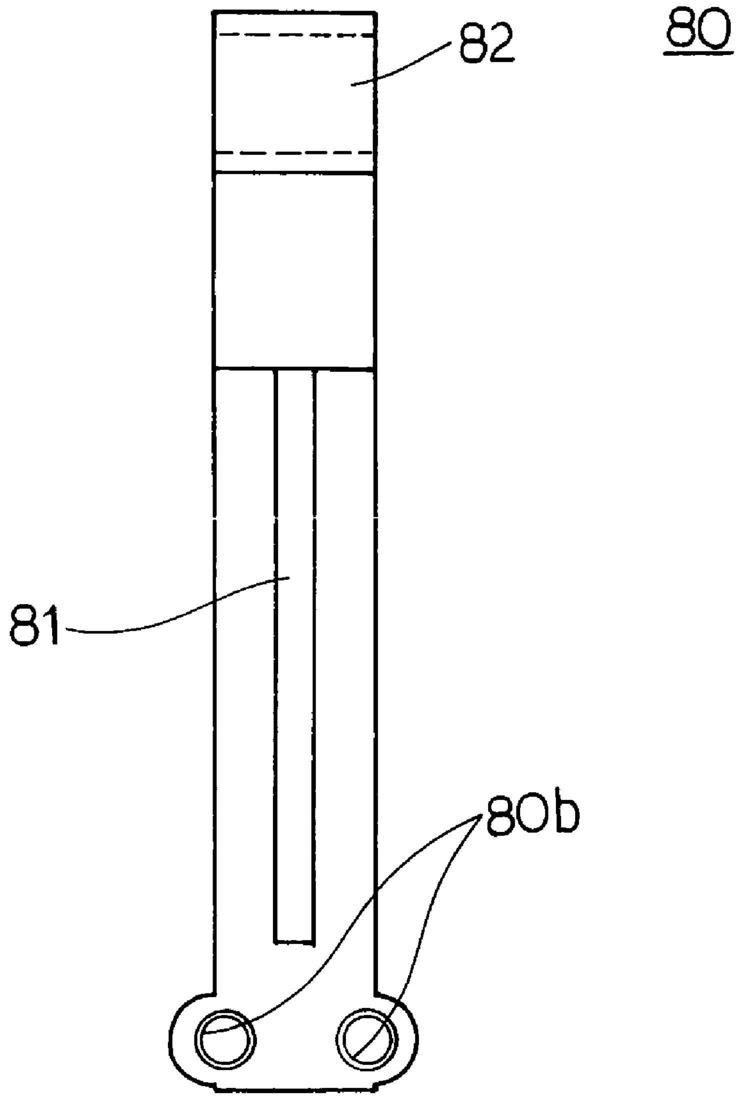
FIG. 20 is a front elevational view of the core element incorporated in the follower member of the discharge device for worked material according the fifth embodiment of the present invention.
Figure 21:
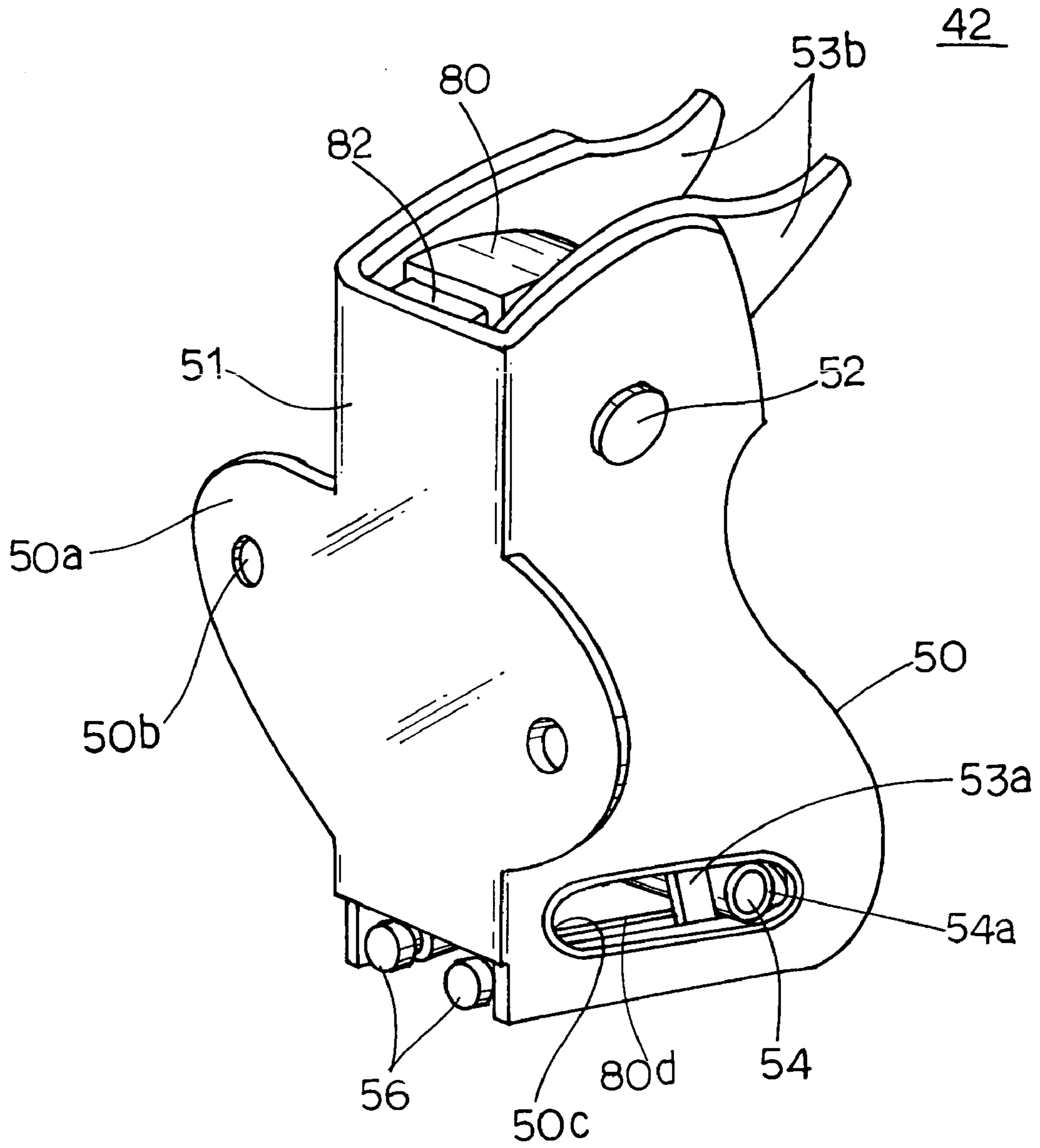
FIG. 21 is a perspective view of the follower member of the discharge device for worked material according the fifth embodiment of the present invention.

A follower pivot pin 52 is supported between the upper portions of both side plates of the casing 50. A pair of actuator members 53 operable to cause the reciprocating motion of the chute 7A is fitted (pivotally supported) in their root portions to the follower pivot pin 52 in the vicinity of its both ends, respectively. Further, in the intermediate portion of the follower pivot pin 52, an upper portion of core element (spacer) 80 shown in FIGS. 19 and 20 is pivotally supported via the pin hole 80*a*. Detailed description of the core element 80 and the chute 7A will be given later.

Figure 17:
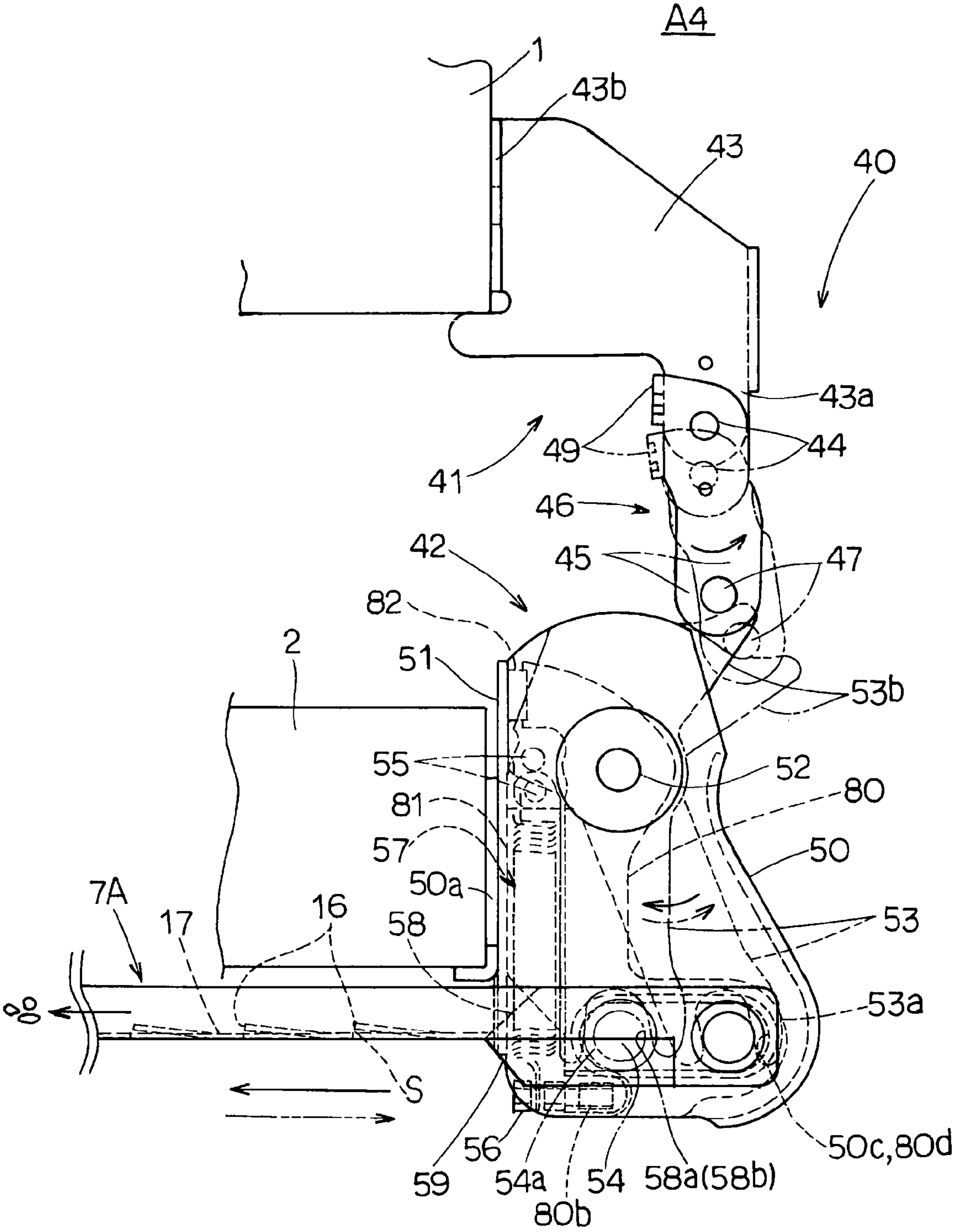
FIG. 17 is a side elevational view showing main components of a discharge device of worked material according to a fifth embodiment of the present invention.
Figure 18:
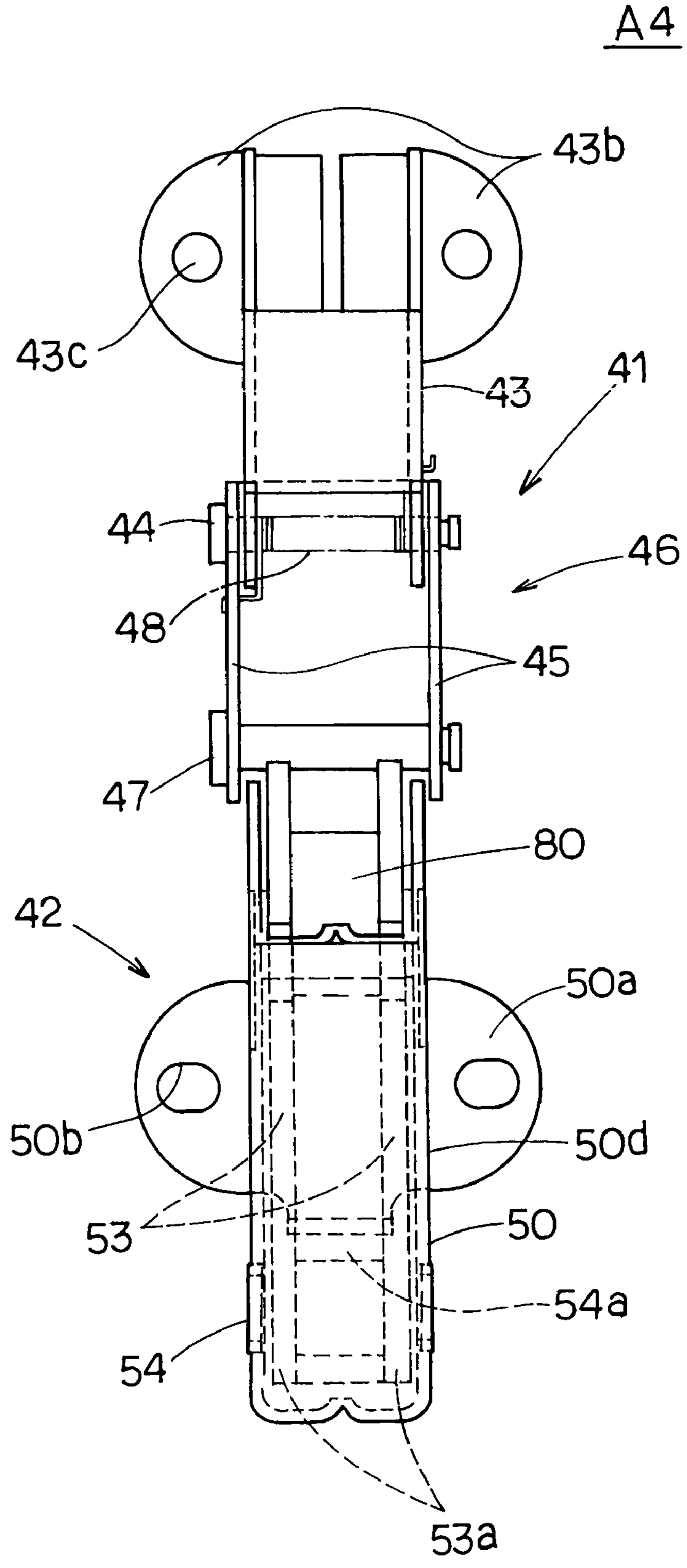
FIG. 18 is a front elevational view showing main components of the discharge device for worked material according the fifth embodiment of the present invention.

The pair of actuator members 53 is small plates made of metal, each having a substantially hummer configuration in side elevational view (see FIG. 17). A two-forked chute interlocking element 53*a* operable for interlocking with a connection pin 54 for the chute 7A is arranged in a lower end of each actuator member 53, or the lower end of a shaft portion of the hummer, which will be described later in more detail. The connection pin 54 in the intermediate section along its length is externally fitted with a bush 54*a* made of metal and having a short cylindrical shape. A pair of input protrusions 53*b* are integrally formed with the pair of actuator members 53 in their root portions and in the ends thereof opposite to their discharging sides of the scrap 3*b*. Further, an upper small pin 55 is fixedly attached to and extends between the lower corners in the root portions of the pair of actuator members 53 in their discharging sides of the scrap 3*b*. In addition, a small pin 55*a* is fixedly attached to and extends between the lower ends of the pair of actuator members 53. On the other hand, a pair of threaded bores 80*b* are arranged in the surface of the lower end of the core element 80 facing to the lower die side, into which a pair of lower small pins 56 is inserted as partially protruding outside.

Two elongated coil springs (follower resilient members) 57 extend between both ends of the upper small pin 55 and the pair of lower small pins 56, respectively. The spring force from both coil springs 57 presses edges of the root portions of the pair of actuator members 53 defined in the discharging side of the scrap 3*b* against an inner surface of the back plate 51 of the casing 50. In this state, each of the two-forked chute interlocking elements 53*a* is placed in the casing 50 in a position opposite to the discharging side of the scrap 3*b*. Each of the two-forked chute interlocking element 53*a* is in sliding contact with the connection pin 54 via a curved surface. The contact engagement between the curved surfaces increase the effective contact areas thereof and this helps reduce the stress acting on the sliding contact surface.

Turning now to FIGS. 19 and 20, the core member 80 will be described in detail.

The core element 80 is an elongated casting element made of cast steel. A grease injection hole 80*e* is formed in an upper portion of the core element 80, which extends from its outer surface defined in an expanded section 80*c* side, which will be described later, and is in communication with an inner wall surface of a pin hole 80*a*. The core element 80 has a long trunk section including a vertically elongated contact protrusion 81 that is integrally formed with the trunk section and extends along a surface thereof defined in the back plate 51 side so as to come into contact with the back plate 51 almost along its full length. An upper end portion of the core element 80 is curved at 90 degrees toward the back plate 51 side, and an end thereof is fixedly attached with a cushion element 82 made of urethane rubber and having a rectangular shape in elevational view. Further, the expanded section 80*c* is formed in a lower end portion of the core element 80 protruding in a direction opposite to that of the contact protrusion 81. An elongated hole 80*d* is formed in the expanded section 80*c*, which has the same geometry as the elongated hole 50*c* of the casing 50, as will be described later. The length of the bush 54*a* is slightly shorter than the thickness of the expanded section 80*c*.

As the core element 80 is mounted on the follower pivot pin 52 by inserting it into the pin hole 80*a*, the cushion element 82 comes into contact with the inner surface of the back plate 51 in its upper end portion, while the end surface of the contact protrusion 81 comes into contact with the back plate 51 along its central zone. At that time, the elongated hole 80*d* of the expanded section 80*c* is in alignment with the elongated hole 50*c* of the casing 50. Grease (e.g., “Molybdenum”, the trade mark) serving as a lubricating agent has been injected in the sliding contact site between the bush 54*a* and the elongated holes 50*c*, 80*c* and the pivotal supporting sites between the follower pivot pin 52 and the core element 80 and the pair of actuator members 53 so as to facilitate the sliding and rotational motions of respective components. Especially, the injection of the grease to the pin hole 80*a* of the core element 80 is carried out via the injection hole 80*e*.

Figure 22:
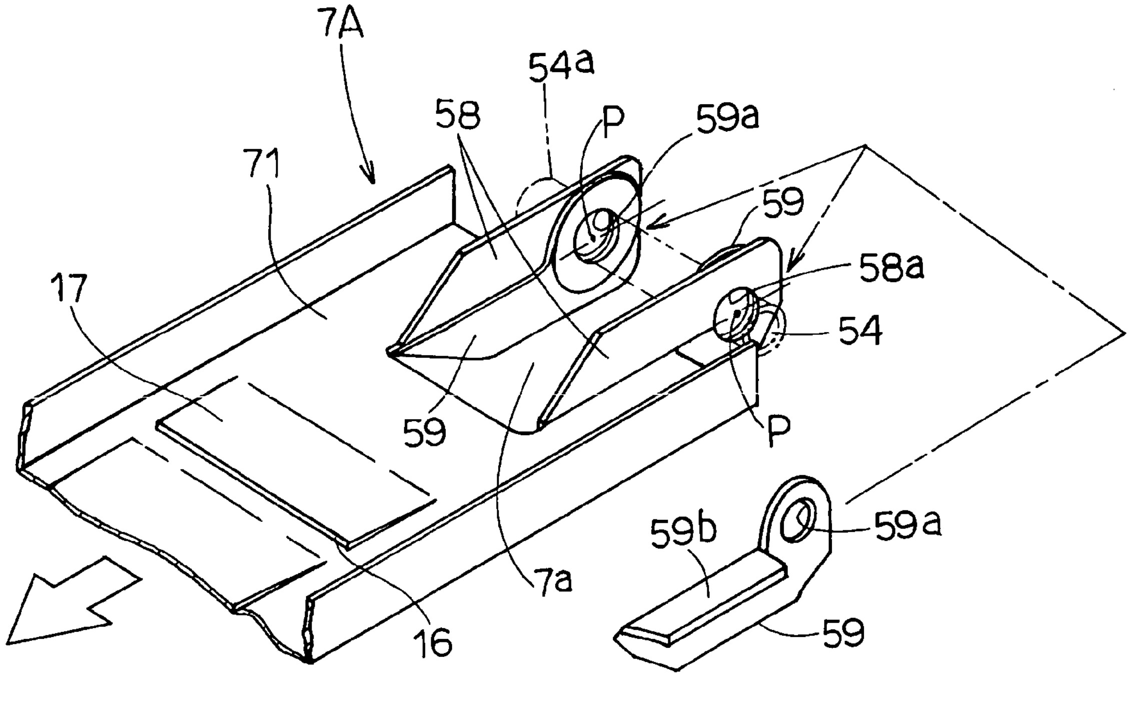
FIG. 22 is a perspective view showing main components of a chute of the discharge device for worked material according the fifth embodiment of the present invention.

With reference to FIGS. 17 and 22, the chute 7A will now be described in detail.

The chute 7A used in the discharge device A4 is characterized in that the connection with the actuator member 53 is substantially coplanar with the receiving surface 17 of the receiving plate 71.

The structure of the chute 7A will be described below more specifically.

An opening 7*a* having a rectangular shape in plan view is formed in the laterally intermediate portion in the end of the chute 7A opposite to the discharging side of the scrap 3*b*. The casing 50 in its lower end is accommodated in the opening 7*a*. A pair of parallel connecting protrusions (connection) is disposed along opposite edges of the opening 7*a* in a width direction of the chute, each extending upward to face to each other. A pair of connection hole 58*a* is formed through the pair of connecting protrusions 58 in their end portions opposite to the discharging side of the scrap 3*b*. An imaginary center P of each of the connection holes 58*a* is in a plane substantially coplanar with the receiving surface 17 of the receiving plate 71. The short connection pin 54 is inserted through both connection holes 58*a*. The connection pin 54 in the vicinity of its ends is engaged with the chute interlocking elements 53*a* of said actuator member 53. Further, the both end portions of the connection pin 54 are loosely inserted in the elongated holes 50*c* of the casing 50, respectively.

The pair of connecting protrusions 58 is reinforced by a pair of reinforcement plate strip (reinforcement member) 59 extending along the length of the chute 7A. Each of the pair of reinforcement members 59 includes a raised end portion opposite to the discharging side of the scrap 3*b*, and each raised end portion includes a connection hole 59*s* having the same diameter with that of the connection hole 58*a*. Further, a bent section 59*b* is integrally formed with the reinforcement plate strip 59 extending from an upper edge thereof excluding the raised end portion, which is to be attached by welding to an under surface of the chute 7A in its site defining the opening 7*a*. The direction of bending of the bent section 59*b* is defined such that the bent section 59 comes in contact with the under surface of the chute 7A in the site defining the opening 7*b* when it is placed to reinforce the connecting protrusion 58.

The hit wall 16 and the receiving surface 17 of the chute 7A have been formed at one time in the press working by the dies for the receiving plate 71. Owing to this, a plurality of oil extraction slits S is formed extending along the width direction of the chute 7A in the connections between the hit walls 16 and the receiving surfaces 17. Any oil deposited on the scrap 3*b* is discharged downward through those slits S. In the illustrated fifth embodiment, the slits S are not extending along the full width of the receiving plate 71. If those slits extend along the full width of the receiving plate 71, then the effect of oil extraction can be enhanced.

Again with reference to FIGS. 17 and 22, an operation of the discharge device A4 for worked material according to the fifth embodiment will be described. In the condition where the upper die 1 has been moved up, the cam body 46 is in its stationary position and the chute 7A is in its initial position.

Starting from the above condition, the upper die 1 is moved down at a predetermined speed so as to cooperate with the lower die 2 for applying press working to the raw material. Those pieces of scrap 3*b* produced in this press working drop onto respective receiving surfaces 17 of the chute 7A.

As the upper die 1 is further lowered, the cam member 41 is also lowered to bring the input pin 47 in the front end portion of the cam body 46 into contact with the pair of input protrusions 53*b* of the follower member 42. This cause the pair of actuator members 53 to rotate clockwise in FIG. 17 (in the direction designated by the solid arrow in FIG. 17) against the spring force from the two coil springs 57 around the follower pivot pin 52 by a predetermined angle at a predetermined speed. During this operation, the cam body 46 is lowered while, in association with the rotation of the pair of input protrusions 53*b*, rotating anti-clockwise in FIG. 17 (in the direction designated by the arrow in FIG. 17) against the spring force from the coil spring 48 around the cam pivot pin 44 by a predetermined angle. This causes the pair of actuator members 53 to rotate clockwise in FIG. 17 to thereby actuate the chute 7A so as to make a forward movement in the discharging direction of the scrap 3*b* at a high speed via the connection pin 54. Consequently, a specified inertia force acts on the scrap 3*b* that has dropped on the receiving surface 17 of the chute 7A, and upon stopping of the chute movement, the inertia force takes effect over the static frictional force, so that the scrap 3*b* is carried over the chute 7A in the discharging direction and ultimately discharged out of the chute 7A. In this regard, owing to the extension of the coil spring 57 in association with the rotation of the pair of actuator members 53, the contact protrusion 81 of the core member 80 in its lower end is strongly pressed against the back plate 51. This displaces the cushion element 82 away from the back plate 51 by a small distance. In FIG. 17, the positions of the cam body 46, the actuator members 53 and the pair of input protrusions 53*b* indicated by the chain double-dashed line, respectively, represent those corresponding to the forward moved position of the chute 7A that has been moved in one direction from its initial position.

Then, as the cam member 41 is lowered further in conjunction with the downward movement of the upper die 1, the input pin 47 carries on the anti-clockwise rotation in FIG. 17 against the spring force from the coil spring 48 around the cam pivot pins 44 and finally rides over the pair of input protrusions 53*b*. That is, at the time when the upper die 1 has reached the lower dead point, the contact engagement between the input pin 47 and the pair of input protrusions is released. At that moment, just before the bush 54*a* impinges upon the inner wall of the elongated hole 80*d* in its outlet side of the scrap 3*b*, the pair of actuator members 53 is rotated anti-clockwise in FIG. 17 in the direction opposite to and at a speed higher than those in the forward movement. This brings the edge of the root portion of the actuator member 53, which is located in the discharging side of the scrap 3*b*, into contact with the inner surface of the back plate 51 of the casing 50 and thus stops the rotation thereof. Almost of all of an impact force produced at that time is received by the cushion element 82 of the core element 80 pivotally supported on the follower pivot pin 52 to reduce (absorb) the impact force. In addition, the bush 54*a* externally fitted over the connection pin 54 impinges upon the inner wall of the elongated hole 80*d* in its side opposite to the outlet of the scrap 3*b*. This can reduce the impact force to be applied to the pair of chute interlocking elements 53*a*. Consequently, the pair of actuator members 53 is hardly broken even after the long operating period of the discharge device A4. In the above operation, the connection pin 54 would not impinge upon the inner wall of the elongated hole 80*d* of the core element 80 defined in its side opposite to the discharge side of the scrap 3*b* but there is created a small gap therebetween. The pair of chute interlocking elements 53*a* is moved back to the side in the casing 50 opposite to the discharging side of the scrap 3*b*. In association with this, the chute 7A together with the connection pin 54 makes a backward movement in the direction opposite to the discharging side of the scrap 3*b* at a predetermined high speed (higher than the forward movement).

Then, the cam body 46 is lifted up by moving up the upper die 1. Ultimately, the input pin 47 is disengaged from the pair of input protrusions 53*b*, and the upper die 1 returns back to the upper dead point.

As discussed above, to make a reciprocating motion of the chute 7A, the connection between the pair of actuator members 53 and the chute 7A is in the plane substantially coplanar with the receiving surface 17 of the receiving plate 71. Owing to this configuration, the connection is subject only to a tension load and a compression load. Assuming that a protrusion is provided in a part of the receiving plate 71 and a connection is placed therein, a shear load would be exerted on a root of the protrusion during the reciprocating forward and backward motion of the chute 7A. When the same magnitude of loading is applied, the loading of the tension load or the compression load as those of the fifth embodiment would result in a possibly reduced damage to the connection as compared to the shear load. As is obvious, this configuration helps the connection between the pair of actuator members 53 and the chute 7A be hardly broken even after a long operating period of the chute 7A in the reciprocating motion.

Further, in this configuration, the connection between the pair of actuator members 53 and the chute 7A is reinforced by the pair of reinforcement plate strip 59. This can enhance the strength of the connection. Consequently, the connection between the pair of actuator members 53 and the chute 7A is possibly more hard to be broken.

Further, the front end portion of the cam body 46, as in its stationary position before the input force is applied thereto from the input pin 47, is prohibited from rotating toward the discharging side of the scrap 3*b* by the stopper 49. The input pin 47 in the stationary position is offset from the point just below the cam pivot pin 44 in the side opposite to that of the discharging of the scrap 3*b*. Owing to this arrangement, when the input pin 47 comes into contact with the pair of input protrusions 53*b*, the cam body 46 is subject to the loading from this offset position. Consequently, while the input pin 47 is in contact with the pair of input protrusions 53*b*, the cam body 46 is always subject to the effect of rotational force around the cam pivot pin 44. Thus, the smooth input operation from the cam body 46 to the pair of actuator members 53 is facilitated. Owing to this effect, possible buckling of the input pin 47 and input protrusion 53*b* can be avoided, which tends to occur due to the sticking of the rotational motion of the cam body 46 when the input pin 47 is disposed just below the cam pivot pin 44, for example.

As it is, during the downward movement of the upper die 1, the force-greater than the frictional force acting between the scrap 3*b* and the chute 7A is applied to the chute 7A by the cam mechanism 40. At that time, the moving speed of the chute 7A is kept constant during the period in dependence on the lowering speed of the upper die 1. Accordingly, this facilitates a stable discharging of the scrap 3*b* from the chute 7A to the outside.

Further, when the cam mechanism 40 is disposed in the chute 7A in its side opposite to that of the discharging of the scrap 3*b* as discussed above, the cam mechanism 40 may be of push-type for pushing the chute 7A toward the discharging side.

Other parts of the configuration, the operation and the effect of the illustrated embodiment are substantially the same as in the first embodiment, and the further description will be herein omitted.

Figure 23:
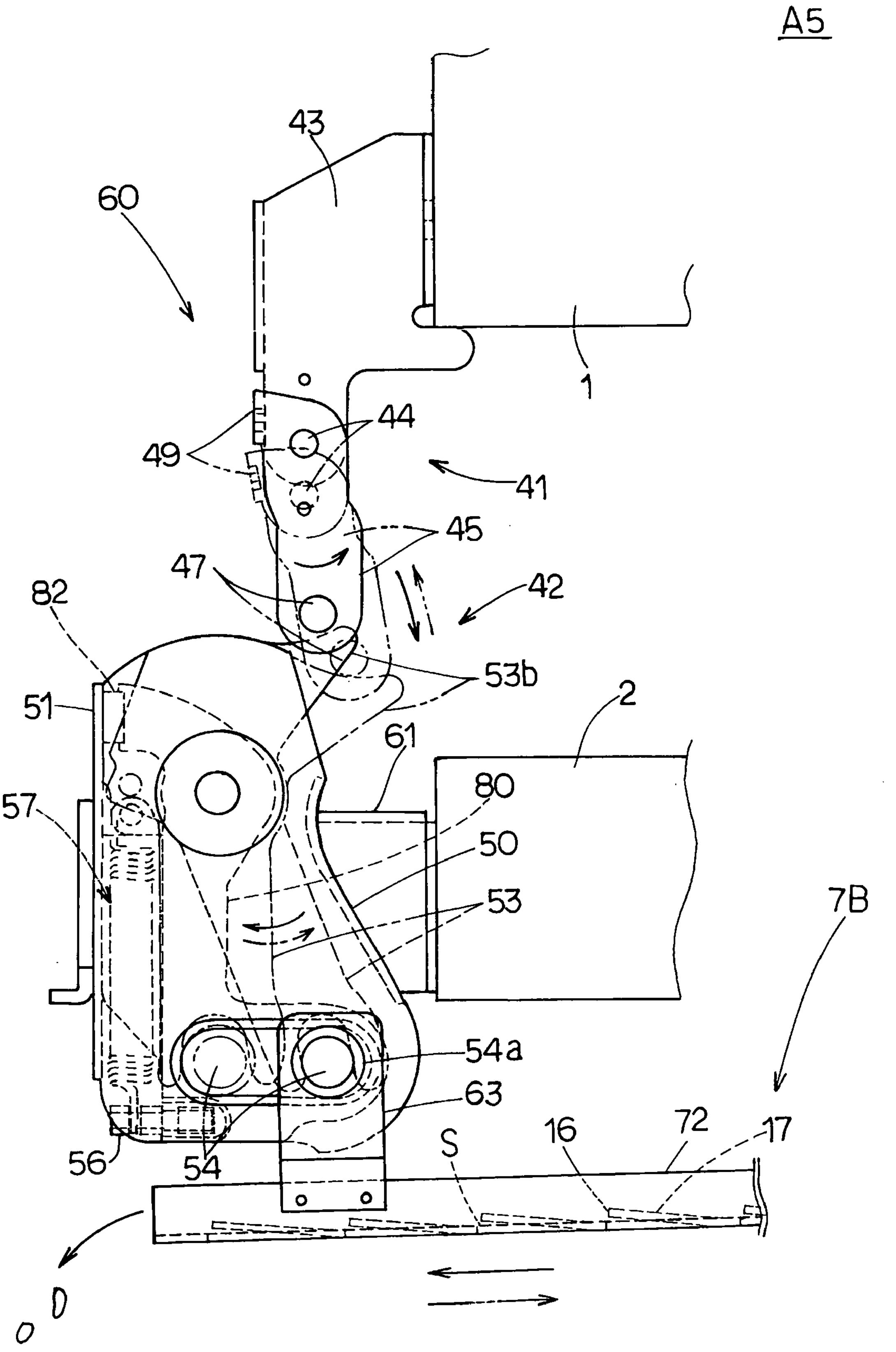
FIG. 23 is a side elevational view showing main components of a discharge device for worked material according a sixth embodiment of the present invention.

With reference to FIG. 23, a sixth embodiment of the present invention will now be described.

As shown in FIG. 23, a discharge device A5 for worked material according to the sixth embodiment is a variation of the above-described discharge device A4 for worked material of the fifth embodiment, that has been modified so that the cam mechanism 60 incorporated in the device of the fifth embodiment is disposed in the upper die 1 and the lower die 2 in their discharging side of the scrap 3*b*.

Specifically, the mounting bracket 43 for the cam member 41 is disposed in the end of the upper die 1 defined in its discharging side of the scrap 3*b*. Further, the casing 50 of the follower member 42 is connected to the end of the lower die 2 defined in its discharging side of the scrap 3*b* via a connecting member 61. In this case, both of the input protrusions 53*b* are disposed in the casing 50 specifically in its side opposite to the discharging side of the scrap 3*b*. An opening is formed in the bottom end of the plate of the casing 50 defined in its side opposite to the discharging side of the scrap 3*b*.

If the cam mechanism 60 is disposed in the chute 7A in its discharging side of the scrap 3*b* as described above, the cam mechanism 60 may be of pull-type for pulling out the chute 7A toward the outlet.

Figure 24:
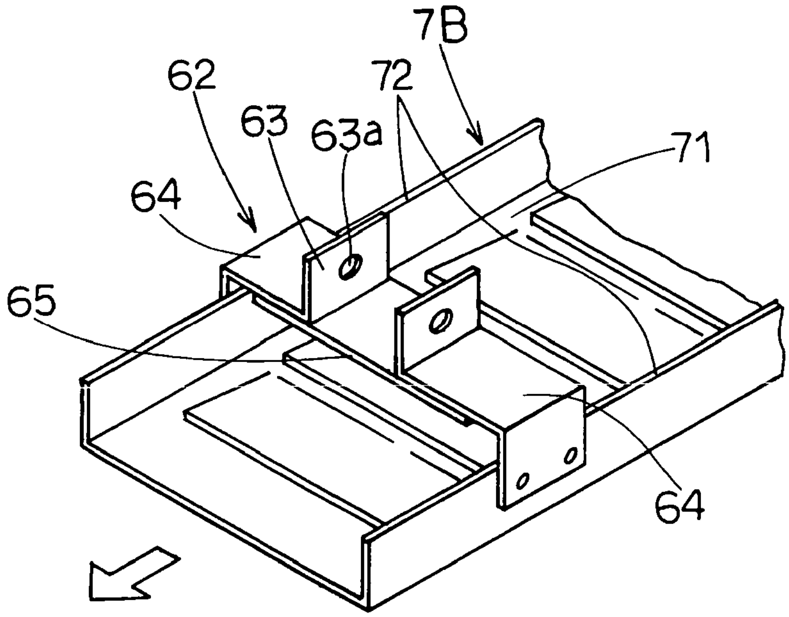
FIG. 24 is a perspective view showing main components of a chute of the discharge device for worked material according the sixth embodiment of the present invention.

Turning now to FIGS. 23 and 24, a chute 7B will be described. A connecting bracket 62 having an opening side with a configuration of substantially C-shaped profile open in its bottom is fixedly attached at its respective ends to both side plates 72 of the chute 7B so as to extend across above a portion of the chute 7B defined in the discharging side of the scrap 3*b*. A pair of connection strips 63 with pin holes 63*a*, through which the connection pin 54 is to be inserted, is disposed in both sides of an intermediate zone of a horizontal frame of the connecting bracket 62 with some distance placed therebetween (preferably, the connection strip may be configured in a triangular shape rather than a rectangular shape so as to enhance a connecting strength, especially a bearing function against the force acting in the chute driving direction). The connecting bracket 62 may be fabricated from two pieces of plate 64 each having a Z-shaped profile, which are interconnected with a small plate 65 attached thereto from under side.

Other parts of the configuration, the operation and the effect of the sixth embodiment could fall in a range of analogy from the fifth embodiment, and the further description should be herein omitted.

Figure 25:
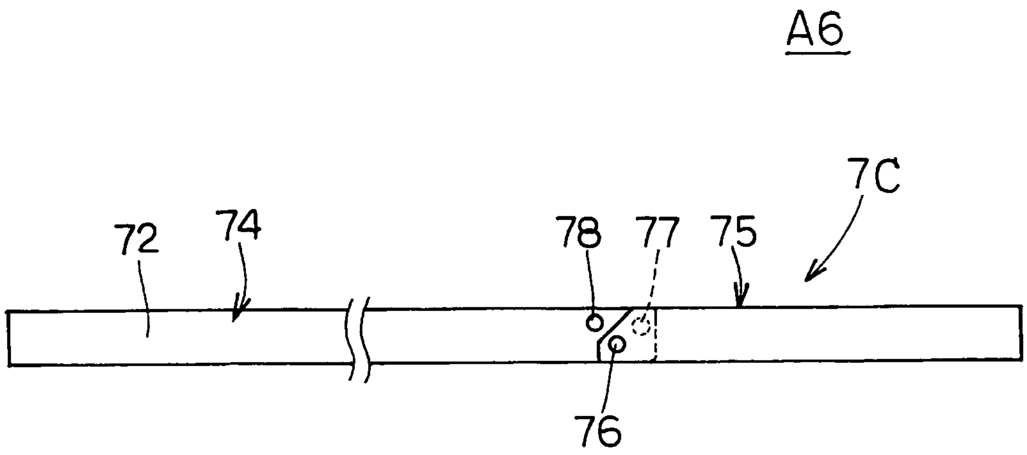
FIG. 25 is a side elevational view of a chute of a discharge device for worked material according a seventh embodiment of the present invention, showing the chute being in use.
Figure 26:
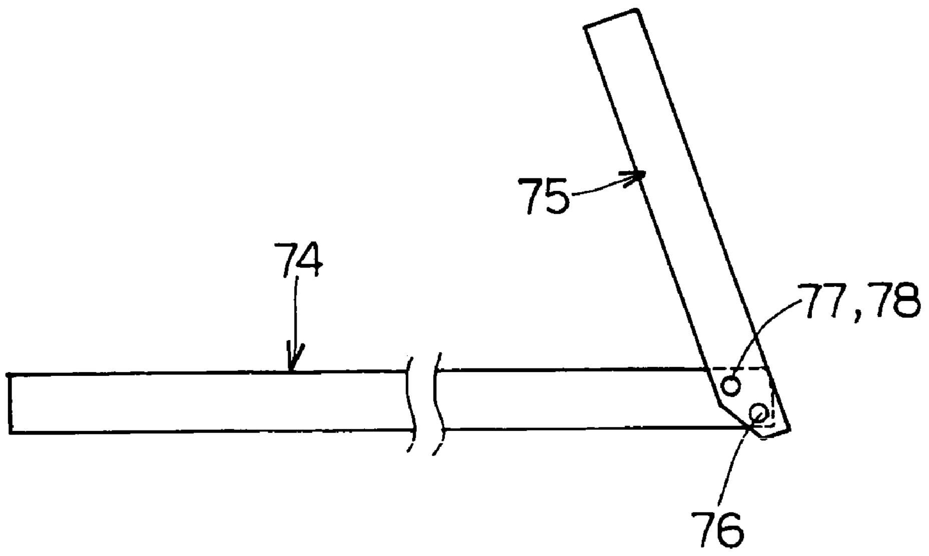
FIG. 26 is a side elevational view of the chute of the discharge device for worked material according the seventh embodiment of the present invention, showing the chute having been folded.
Figure 27:
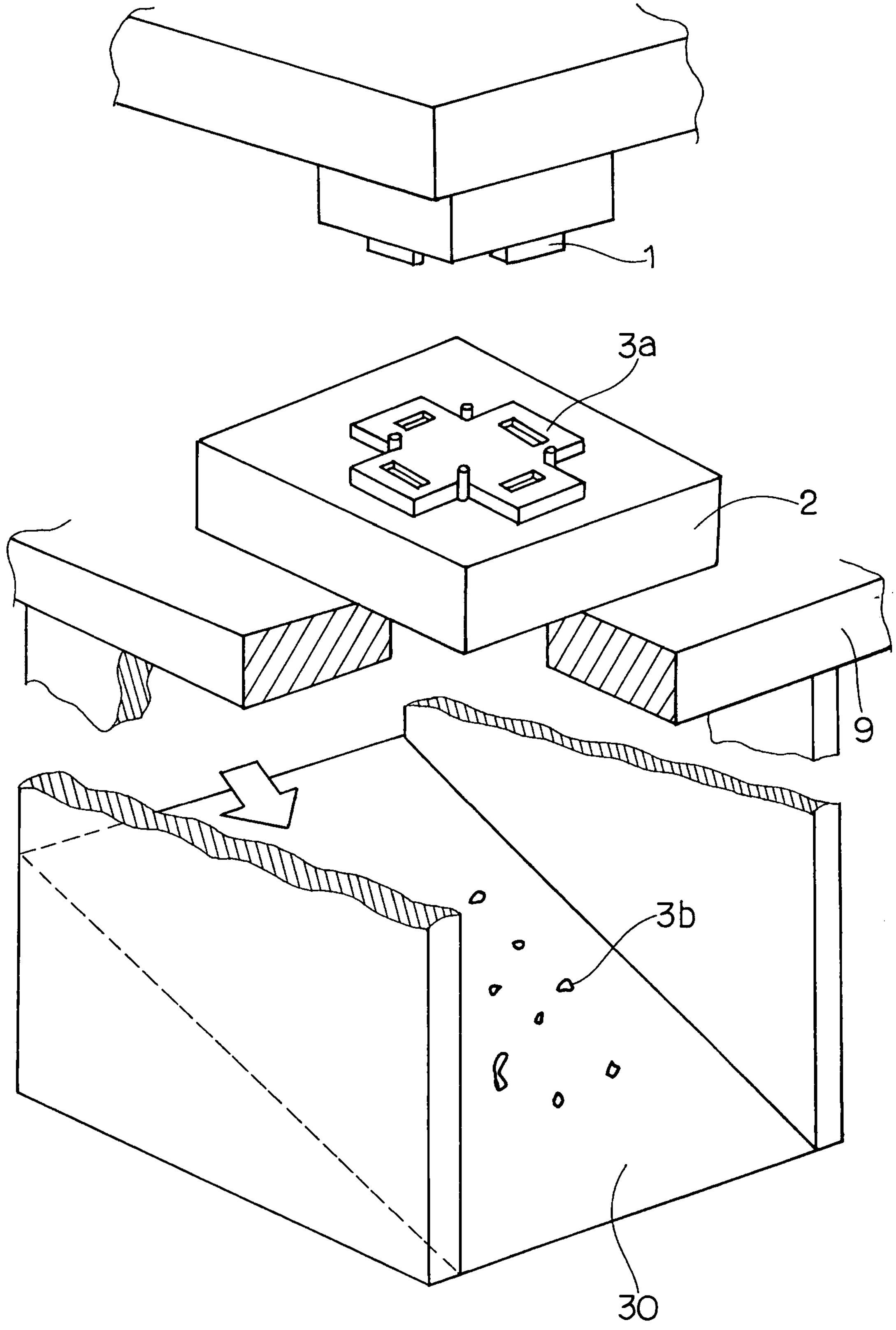
FIG. 27 is a perspective view of a discharge device for worked material according to the prior art.

Turning now to FIGS. 25 and 26, a seventh embodiment of the present invention will be described.

As shown in FIGS. 25 and 26, a discharge device A6 for worked material according to the seventh embodiment is an example characterized in that it has employed a long chute 7C with a foldable head portion instead of the above-discussed chute 7A of the discharge device A4 for worked material in the fifth embodiment or instead of the above-discussed chute 7B of the discharge device A5 for worked material in the sixth embodiment. Specifically, the chute 7C includes a chute body 74 and a chute head 75 pivotally supported by an end-portion of the chute body 74 via a pair of pivot pins 76. The both pivot pins 76 are fitted in the end portions of the both side plates 72 of the chute body 74 in its receiving plate 71 side and in the corresponding root portions of the both side plates 72 of the chute head 75 in its receiving plate 71 side, respectively. Upper portions of both side plates 72 in the root side of the chute head 75 have been cut off diagonally. In the vicinity of the cut-off portions, convex portions 77 are disposed so as to protrude toward the inner side of the chute 7C (FIG. 25). On the other hand, concave portions 78 with which the both convex portions 77 are to be engaged are disposed in the upper portions of the both side plates 72 in the end portions of the chute body 74. The chute head 75 is rotated around the pivot pin 76 to erect within a vertical plane, and the chute 7C is folded (FIG. 26). At that time, the associated convex and concave portions 77, 78 are engaged with each other so as to keep the chute 7C in the folded condition.

Thus, since the chute 7C is foldable, even if the chute 7C defining the discharging path of the scrap 3*b* is made longer, the chute 7C is hardly obstructive during the discharge device A6 for worked material not in use.

It is to be noted that a pair of cam mechanisms for driving the chute may be positioned in both sides in the width direction of the chute. A bracket may be provided to protrude from the under surface of the chute, through which a horizontal rod is inserted to thus construct the driving mechanism. What is important is that the connection between the chute and the cam member should be positioned to be closer to the receiving surface as much as possible to enhance the reinforcement effect.

Other parts of the configuration, the operation and the effect of the seventh embodiment could fall in a range of analogy from the fifth embodiment, and the further description should be herein omitted.

It is needless to say that the present invention is not limited to the press working but also applicable to other types of processing including the cutting, the grinding, the laser processing and so on. In that case, for the application in the cutting, the device may employ a configuration in which the chute is moved forward and backward via a link mechanism, for example, depending on the operations in the processing.

EFFECT OF THE INVENTION

The present invention can bring about the following effects.

(1) The discharge device for worked material of the present invention has employed the drive means allowing a force acting on the worked material, which is given by a movement of the chute, to be greater than a frictional force acting between the worked material and the chute at a moment of subsequent stopping of the chute movement. This can eliminate the need for a supply source of the air and the like.

(2) The chute capable of moving forward and backward within a substantially horizontal plane in association with an up and down movement of the upper die through the driving operation by the drive means is disposed below the lower die. Owing to this configuration, the device of the present invention allows for an operation enabling the worked material to be discharged with simple equipment without any space restriction in the press machine. Further advantageously, a vertical movement of the upper die can be converted by the drive means into the reciprocating motion of the chute in the horizontal direction. Further, a drive source for the press working apparatus and a drive source for the discharge device for worked material can be constructed as a shared source. Further, the device of the present invention can discharge the worked material efficiently at the same time with the press working.

(3) If the cam mechanism having the resilient member is employed as the drive means, an accurate driving of the chute can be accomplished with a simple structure.

(4) If the receiving surface and the hit wall are formed on the chute, the worked material produced in the press working hits on the hit wall, which prohibits its further movement toward the hit wall side. As a result, by the stopping of the chute movement, the worked material can be discharged from the top surface of the chute toward one direction in a reliable and smooth manner.

(5) A number of pairs of receiving surfaces and hit walls can be arranged in series, wherein if each receiving surface is inclined at a predetermined angle relative to the horizontal plane, the chute can be fabricated in a low profile to thus facilitate the down sizing of the discharge device as well as the space saving. This favorably increases the degree of freedom in stroke of the press working apparatus in itself, for example. Further, the present invention allows for the discharging along a slope inclined inversely relative to the discharging direction of the scrap.

(6) The present invention further contemplates the double chute structure comprising the upper chute and the lower chute, wherein if a through-hole or a mesh is formed in the upper receiving surface, the pieces of worked material can be sorted out separately into the upper and the lower chutes. Further, the discharging directions thereof can be desirably designed.

(7) Further, if the connection between the actuator member and the chute is in a plane substantially coplanar with the receiving surface of the receiving plate, then during the reciprocating motion of the chute, the connection between the chute and the actuator member is subject only to a tension load and a compression load rather than a shear load. Owing to this fact, a long operating time of the chute in the reciprocating motion would be less likely to break the connection between the actuator member and the chute.

(8) If the connection between the actuator member and the chute is reinforced with the reinforcement member, the strength in the connection can be enhanced. This can further suppress any damage in the connection.

(9) If the stopper is used to prohibit the rotation of the front end portion of the cam body toward the inner side of the upper die, and the input pin in its suspending state is placed in a position offset outward from a position just below the cam pivot pin, the cam body is always subject to the rotational force around the cam pivot pin when it comes into contact with the actuator member. This can facilitate a smooth input operation from the cam body to the actuator member.

(10) The moving speed of the chute is kept constant throughout the operation, wherein upon stopping of the chute movement, a force greater than a frictional force acting between the worked material and the chute is applied onto the chute by the drive means. Consequently, this ensures that the worked material can be discharged from the chute to the outside of the press working machine in a stable manner.

What is claimed is:

1. A discharge device for worked material, which is disposed in a press working apparatus for applying a press working to a material through a vertical reciprocating motion of an upper die relative to a lower die and which is operable to discharge a worked material produced resultantly from the press working, said device comprising:

a chute adapted to receive the worked material produced resultantly from the press working and to discharge said worked material to the outside of said press working apparatus by making a reciprocating motion within a substantially horizontal plane; and a drive means for driving said chute in response to the vertical reciprocating motion of said upper die, wherein said drive means is adapted to drive said chute such that at a moment of stopping of the chute, a force exerted on the worked material in association with a movement of the chute in a direction of the chute movement is greater than a force exerted on the worked material based on a frictional force between said worked material and said chute in a direction opposite to said direction of the chute movement.

2. A discharge device for worked material in accordance with claim 1, in which said drive means comprises:

a cam member and a follower member which are arranged in contact with each other and are operable to convert a downward movement of said upper die to a forward movement of said chute in one direction within a substantially horizontal plane; and a resilient member, which is operable to bias said chute to make a backward movement in a direction opposite to said one direction of said forward movement when said cam member is disengaged from the contact with said follower member.

3. A discharge device for worked material in accordance with claim 2, in which said chute comprises a receiving plate, said receiving plate having a receiving surface for receiving said worked material that has dropped thereon and a hit wall upon which said worked material hits during said forward and backward movement of said chute, wherein a plurality of pairs of said receiving surface and said hit wall are arranged in series to define a step-like configuration of the receiving surfaces of the receiving plate.

4. A discharge device for worked material in accordance with claim 3, in which said receiving surface is inclined upward by a predetermined angle relative to a substantially horizontal plane.

5. A discharge device for worked material in accordance with claim 4, in which said receiving surface includes a through-hole or a mesh formed therethrough.

6. A discharge device for worked material in accordance with claim 5, said device further comprising a lower chute located below said chute and including a receiving plate for receiving said worked material that has been discharged through said through-hole or mesh, and a lower drive means for driving said lower chute to move forward and backward within a substantially horizontal plane in response to the vertical reciprocating motion of said upper die, said receiving plate of said lower chute comprising a receiving surface and a hit wall upon which said worked material hits during said forward and backward movement of said lower chute.

7. A discharge device for worked material in accordance with claim 2, in which said follower member comprises:

a follower bracket to be attached to said lower die;

an actuator member which is pivotally mounted on said follower bracket via a follower pivot pin so as to be rotatable in a vertical plane and includes an input protrusion protruding in one side of a pivotally supported portion thereof by said follower bracket; and a follower resilient member for biasing said actuator member to a direction, with respect to the rotational directions of said actuator member, opposite to the discharging side of said worked material, and said cam member comprises:

a mounting bracket to be attached to said upper die;

a cam body suspending from said mounting bracket via a cam pivot pin so as to be rotatable in a vertical plane; and a cam resilient member for biasing said cam body to a direction, with respect to the rotational directions of said cam body, opposite to the discharging side of said worked material, wherein a stopper is provided in a root portion of said cam body for prohibiting the rotation of said cam body to a direction, with respect to the rotational directions of said actuator member, toward the discharging side of said worked material, and an input pin is mounted on a front end portion of said cam body, which is to come into contact with said input protrusion of said actuator member and is placed in a point offset from a position just below said cam pivot pin to a direction, with respect to the rotational directions of said cam body, opposite to the discharging side of said worked material.

8. A discharge device for worked material in accordance with claim 3, in which a connection between said follower member and said chute is in a plane substantially coplanar with said receiving surface of said receiving plate.

9. A discharge device for worked material in accordance with claim 3, in which said receiving surface includes a through-hole or a mesh formed therethrough.

10. A discharge device for worked material in accordance with claim 9, said device further comprising a lower chute located below said chute and including a receiving plate for receiving said worked material that has been discharged through said through-hole or mesh, and a lower drive means for driving said lower chute to move forward and backward within a substantially horizontal plane in response to the vertical reciprocating motion of said upper die, said receiving plate of said lower chute comprising a receiving surface and a hit wall upon which said worked material hits during said forward and backward movement of said lower chute.

11. A discharge device for worked material, which is disposed in a press working apparatus for applying a press working a material through a vertical reciprocating motion of an upper die relative to a lower die and which is operable to discharge a worked material produced resultantly from the press working, said device comprising:

a chute adapted to receive the worked material produced resultantly from the press working and to discharge said worked material to the outside of said press working apparatus by making a reciprocating motion within a substantially horizontal plane; and a drive means for driving said chute in response to the vertical reciprocating motion of said upper die, wherein said drive means is adapted to drive said chute such that at a moment of starting of its driving operation, a force exerted on the worked material in association with a movement of the chute in a direction of the chute movement is greater than a force exerted on the worked material based on a frictional force between said worked material and said chute in a direction opposite to said direction of the chute movement.

12. A discharge device for worked material in accordance with claim 11, in which said drive means comprises:

a cam member and a follower member which are arranged in contact with each other and are operable to convert a downward movement of said upper die to a forward movement of said chute in one direction within a substantially horizontal plane; and a resilient member, which is operable to bias said chute to make a backward movement in a direction opposite to said one direction of said forward movement when said cam member is disengaged from the contact with said follower member.

13. A discharge device for worked material in accordance with claim 12, in which said chute comprises a receiving plate, said receiving plate having a receiving surface for receiving said worked material that has dropped thereon and a hit wall upon which said worked material hits during said forward and backward movement of said chute, wherein a plurality of pairs of said receiving surface and said hit wall are arranged in series to define a step-like configuration of the receiving surfaces of the receiving plate.

14. A discharge device for worked material in accordance with claim 13, in which said receiving surface is inclined upward by a predetermined angle relative to a substantially horizontal plane.

15. A discharge device for worked material in accordance with claim 14, in which said receiving surface includes a through-hole or a mesh formed therethrough.

16. A discharge device for worked material in accordance with claim 15, said device further comprising a lower chute located below said chute and including a receiving plate for receiving said worked material that has been discharged through said through-hole or mesh, and a lower drive means for driving said lower chute to move forward and backward within a substantially horizontal plane in response to the vertical reciprocating motion of said upper die, said receiving plate of said lower chute comprising a receiving surface and a hit wall upon which said worked material hits during said forward and backward movement of said lower chute.

17. A discharge device for worked material in accordance with claim 12, in which said follower member comprises:

a follower bracket to be attached to said lower die;

an actuator member which is pivotally mounted on said follower bracket via a follower pivot pin so as to be rotatable in a vertical plane and includes an input protrusion protruding in one side of a pivotally supported portion thereof by said follower bracket; and a follower resilient member for biasing said actuator member to a direction, with respect to the rotational directions of said actuator member, opposite to the discharging side of said worked material, and said cam member comprises:

a mounting bracket to be attached to said upper die;

a cam body suspending from said mounting bracket via a cam pivot pin so as to be rotatable in a vertical plane; and a cam resilient member for biasing said cam body to a direction, with respect to the rotational directions of said cam body, opposite to the discharging side of said worked material, wherein a stopper is provided in a root portion of said cam body for prohibiting the rotation of said cam body to a direction, with respect to the rotational directions of said actuator member, toward the discharging side of said worked material, and an input pin is mounted on a front end portion of said cam body, which is to come into contact with said input protrusion of said actuator member and is placed in a point offset from a position just below said cam pivot pin to a direction, with respect to the rotational directions of said cam body, opposite to the discharging side of said worked material.

18. A discharge device for worked material in accordance with claim 13, in which a connection between said follower member and said chute is in a plane substantially coplanar with said receiving surface of said receiving plate.

19. A discharge device for worked material in accordance with claim 13, in which said receiving surface includes a through-hole or a mesh formed therethrough.

20. A discharge device for worked material in accordance with claim 19, said device further comprising a lower chute located below said chute and including a receiving plate for receiving said worked material that has been discharged through said through-hole or mesh, and a lower drive means for driving said lower chute to move forward and backward within a substantially horizontal plane in response to the vertical reciprocating motion of said upper die, said receiving plate of said lower chute comprising a receiving surface and a hit wall upon which said worked material hits during said forward and backward movement of said lower chute.

* * * * *